(12) United States Patent
MolavianJazi et al.

(10) Patent No.: US 11,350,370 B2
(45) Date of Patent: *May 31, 2022

(54) UPLINK POWER CONTROL

(71) Applicant: Lenovo (Singapore) PTE. LTD., New Tech Park (SG)

(72) Inventors: Ebrahim MolavianJazi, Lincolnwood, IL (US); Vijay Nangia, Woodridge, IL (US); Hyejung Jung, Northbrook, IL (US); Hossein Bagheri, Urbana, IL (US); Joachim Loehr, Wiesbaden (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,786

(22) Filed: Feb. 3, 2021

(65) Prior Publication Data
US 2021/0168726 A1 Jun. 3, 2021

Related U.S. Application Data

(63) Continuation of application No. 16/740,245, filed on Jan. 10, 2020, now Pat. No. 10,945,216.
(Continued)

(51) Int. Cl.
*H04W 52/14* (2009.01)
*H04W 52/08* (2009.01)
(Continued)

(52) U.S. Cl.
CPC ......... *H04W 52/146* (2013.01); *H04W 52/08* (2013.01); *H04W 52/365* (2013.01);
(Continued)

(58) Field of Classification Search
CPC ............... H04W 52/00; H04W 52/146; H04W 72/1268; H04W 52/248; H04W 52/04;
(Continued)

(56) References Cited

U.S. PATENT DOCUMENTS

| 8,897,210 B2 | 11/2014 | Love et al. |
| 10,547,137 B2 * | 1/2020 | Chang .................... H01R 13/41 |

(Continued)

FOREIGN PATENT DOCUMENTS

WO 2018/231141 A1 12/2018

OTHER PUBLICATIONS

Huawei, Hisilicon, "Considerations on multi-panel based uplink transmission", 3GPP TSG RAN WG1 Meeting #88 R1-1701690, Feb. 13-17, 2017, pp. 1-3.
(Continued)

*Primary Examiner* — Dominic E Rego
(74) *Attorney, Agent, or Firm* — Kunzler Bean & Adamson

(57) ABSTRACT

Apparatuses, methods, and systems are disclosed for uplink power control. One method includes receiving uplink power control parameters. The method includes determining a first transmit power for the first uplink transmission based on a corresponding first set of uplink power control parameters. The method includes determining a second transmit power for the second uplink transmission based on a corresponding second set of uplink power control parameters. The method includes performing the first uplink transmission using a first uplink transmission beam pattern or a first spatial domain transmission filter based on the first transmit power. The method includes performing the second uplink transmission using a second uplink transmission beam pattern or a second spatial domain transmission filter based on the second transmit power.

20 Claims, 4 Drawing Sheets

Related U.S. Application Data

(60) Provisional application No. 62/790,954, filed on Jan. 10, 2019.

(51) Int. Cl.
  *H04W 52/36* (2009.01)
  *H04W 52/54* (2009.01)
  *H04W 72/12* (2009.01)
  *H04W 52/42* (2009.01)

(52) U.S. Cl.
  CPC ......... *H04W 52/367* (2013.01); *H04W 52/42* (2013.01); *H04W 52/54* (2013.01); *H04W 72/1268* (2013.01)

(58) Field of Classification Search
  CPC .. H04W 72/00; H04W 72/12; H04W 72/1278
  See application file for complete search history.

(56) References Cited

U.S. PATENT DOCUMENTS

| | | | |
|---|---|---|---|
| 10,588,029 | B1 | 3/2020 | Kay et al. |
| 10,912,037 | B2 * | 2/2021 | Zhang ............... H04W 52/223 |
| 2011/0143807 | A1 * | 6/2011 | Aue .................... H04B 7/0682 455/522 |
| 2017/0303214 | A1 | 10/2017 | Lim et al. |
| 2017/0332386 | A1 * | 11/2017 | Li ...................... H04W 72/1242 |
| 2018/0132264 | A1 | 5/2018 | Jung et al. |
| 2018/0212813 | A1 | 7/2018 | Kim et al. |
| 2018/0213485 | A1 * | 7/2018 | Sundararajan ...... H04W 52/325 |
| 2019/0053227 | A1 | 2/2019 | Huang et al. |
| 2019/0109697 | A1 | 4/2019 | Lee et al. |
| 2019/0159134 | A1 | 5/2019 | Wang et al. |
| 2019/0159136 | A1 | 5/2019 | MolavianJazi et al. |
| 2020/0053743 | A1 | 2/2020 | Cheng |
| 2020/0059868 | A1 | 2/2020 | Yang et al. |
| 2020/0059943 | A1 | 2/2020 | Ren et al. |
| 2020/0170032 | A1 | 5/2020 | Li et al. |

OTHER PUBLICATIONS

LG Electronics, "Discussion on beam-specific power control for UL", 3GPP TSG RAN WG1 Meeting #89 R1-1707681, May 15-19, 2017, pp. 1-3.

LG Electronics, "Discussion on UL power control for NR", 3GPP TSG RAN WG1 Meeting #87 R1-1611831, Nov. 14-18, 2016, pp. 1-5.

Zte, "Discussion on UL power control for multi-panel operation", 3GPP TSG RAN WG1 Meeting #95 R1-1812262, Nov. 12-16, 2018, pp. 1-3.

Zte, Zte Microelectronics, "Discussion on UL power control for NR", 3GPP TSG RAN WG1 Meeting #88 R1-1701822, Feb. 13-17, 2017, pp. 1-3.

Ericsson, "On power control for NR", 3GPP TSG-RAN WG1 #88 R1-170, Feb. 13-17, 2017, pp. 1-4.

Interdigital Communications, "On Power Control Processes for Multi Beam Transmission in NR", 3GPP TSG RAN WG1 Meeting #88bis R1-1705515, Apr. 3-7, 2017, pp. 1-4.

3GPP, "3rd Generation Partnership Project; Technical Specification Group Radio Access Network; NR; Physical layer procedures for control (Release 15)", 3GPP TS 38.213 V15.3.0, Sep. 2018, pp. 1-101.

3GPP, "3rd Generation Partnership Project; Technical Specification Group Radio Access Network; NR; Physical layer procedures for data (Release 15)", 3GPP TS 38.214 V15.3.0, Sep. 2018, pp. 1-96.

Huawei, Hisilicon, "UL power control for NR MIMO", 3GPP TSG RAN WG1 Meeting #86bis R1-1608821, Oct. 10-14, 2016, pp. 1-4.

Qualcomm Incorporated, "Bean Management for NR", 3GPP TSG-RAN WG1 Meeting #95 R1-1813876, Nov. 12-16, 2018, pp. 1-5.

Motorola Mobility, Lenovo, "On non-CA NR UL power control", 3GPP TSG RAN WG1 #91 R1-1720928, Nov. 27-Dec. 1, 2017, pp. 1-12.

Nokia at el, "On UE Power Saving Triggering Mechanisms", 3GPP TSG RAN WG1 Meeting #95 R1-18113621, Nov. 12-16, 2018, pp. 1-6.

* cited by examiner

UPLINK POWER CONTROL

CROSS-REFERENCE TO RELATED APPLICATIONS

This application is a continuation application of U.S. patent application Ser. No. 16/740,245 filed on Jan. 10, 2020, which claims priority to U.S. Patent Application Ser. No. 62/790,954 entitled "POWER CONTROL FOR MULTI-PANEL UPLINK TRANSMISSION" and filed on Jan. 10, 2019 for Ebrahim MolavianJazi, all of which are incorporated herein by reference in their entirety.

FIELD

The subject matter disclosed herein relates generally to wireless communications and more particularly relates to uplink power control.

BACKGROUND

The following abbreviations are herewith defined, at least some of which are referred to within the following description: Third Generation Partnership Project ("3GPP"), $5^{th}$ Generation ("5G"), Additional MPR ("A-MPR"), Positive-Acknowledgment ("ACK"), Aggregation Level ("AL"), Access and Mobility Management Function ("AMF"), Access Point ("AP"), Access Stratum ("AS"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Dynamic Point Selection ("DPS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), Enhanced MIMO ("eMIMO"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Non-Coherent Joint Transmission ("NCJT"), Network Entity ("NE"), Network Function ("NF"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Primary MPR ("P-MPR"), Pathloss ("PL"), Power Angular Spectrum ("PAS"), Physical Broadcast Channel ("PBCH"), Power Amplifier ("PA"), Power Control ("PC"), UE to UE interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Sidelink Control Channel ("PSCCH"), Primary Secondary Cell ("PSCell"), Power Spectrum Density ("PSD"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Redundancy Version ("RV"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sub-carrier Spacing ("SCS"), Service Data Unit ("SDU"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Scheduling Resource Indicator ("SRI"), Sounding Reference Signal ("SRS"), Shortened TTI ("sTTI"), Synchronization Signal ("SS"), Sidelink SSB ("S-SSB"), Synchronization Signal Block ("SSB"), Supplementary Uplink ("SUL"), Subscriber Permanent Identifier ("SUPI"), Timing Advance ("TA"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UNITS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Visiting AMF ("vAMF"), Visiting NSSF ("vNSSF"), Visiting PLMN ("VPLMN"), and Worldwide Interoperability for Microwave Access ("WiMAX").

In certain wireless communications networks, a UE may have multiple panels.

BRIEF SUMMARY

Methods for uplink power control are disclosed. Apparatuses and systems also perform the functions of the methods. One embodiment of a method includes receiving a first message that configures reception of scheduling information for a first maximum number of overlapping uplink transmissions for a serving cell, wherein each uplink transmission of the first maximum number of overlapping uplink transmissions for the serving cell corresponds to an uplink transmission beam pattern of a plurality of uplink transmission beam patterns or a spatial domain transmission filter of a plurality of spatial domain transmission filters. In some embodiments, the method includes receiving a second message that configures uplink power control parameters for each uplink beam pattern of the plurality of uplink transmission beam patterns or each spatial domain transmission filter of the plurality of spatial domain transmission filters. In certain embodiments, the method includes receiving scheduling information for a first plurality of overlapping uplink transmissions for the serving cell based on the configuration of the first message, wherein: a number of the first plurality of overlapping uplink transmissions is no more than the configured first maximum number of overlapping uplink transmissions; the first plurality of overlapping uplink transmissions comprises a first uplink transmission and a second uplink transmission; the first uplink transmission corresponds to a first uplink beam pattern of the plurality of uplink transmission beam patterns or a first spatial domain transmission filter of the plurality of spatial domain transmission filters; the second uplink transmission corresponds to a second uplink beam pattern of the plurality of uplink transmission beam patterns or a second spatial domain transmission filter of the plurality of spatial domain transmission filters; and the scheduling information comprises two transmit power control commands that are associated with a same closed-loop power control process. In various embodiments, the method includes determining a first transmit power for the first uplink transmission based on a corresponding first set of uplink power control parameters. In some embodiments, the method includes determining a second transmit power for the second uplink transmission based on a corresponding second set of uplink power control parameters. In certain embodiments, the method includes performing the first uplink transmission using the first uplink transmission beam pattern or the first spatial domain transmission filter based on the first transmit power. In various embodiments, the method includes performing the second uplink transmission using the second uplink transmission beam pattern or the second spatial domain transmission filter based on the second transmit power.

One apparatus for uplink power control includes a receiver that: receives a first message that configures reception of scheduling information for a first maximum number of overlapping uplink transmissions for a serving cell, wherein each uplink transmission of the first maximum number of overlapping uplink transmissions for the serving cell corresponds to an uplink transmission beam pattern of a plurality of uplink transmission beam patterns or a spatial domain transmission filter of a plurality of spatial domain transmission filters; receives a second message that configures uplink power control parameters for each uplink beam pattern of the plurality of uplink transmission beam patterns or each spatial domain transmission filter of the plurality of spatial domain transmission filters; and receives scheduling information for a first plurality of overlapping uplink transmissions for the serving cell based on the configuration of the first message, wherein: a number of the first plurality of overlapping uplink transmissions is no more than the configured first maximum number of overlapping uplink transmissions; the first plurality of overlapping uplink transmissions comprises a first uplink transmission and a second uplink transmission; the first uplink transmission corresponds to a first uplink beam pattern of the plurality of uplink transmission beam patterns or a first spatial domain transmission filter of the plurality of spatial domain transmission filters; the second uplink transmission corresponds to a second uplink beam pattern of the plurality of uplink transmission beam patterns or a second spatial domain transmission filter of the plurality of spatial domain transmission filters; and the scheduling information comprises two transmit power control commands that are associated with a same closed-loop power control process. In certain embodiments, the apparatus includes a processor that: determines a first transmit power for the first uplink transmission based on a corresponding first set of uplink power control parameters; determines a second transmit power for the second uplink transmission based on a corresponding second set of uplink power control parameters; performs the first uplink transmission using the first uplink transmission beam pattern or the first spatial domain transmission filter based on the first transmit power; and performs the second uplink transmission using the second uplink transmission beam pattern or the second spatial domain transmission filter based on the second transmit power.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
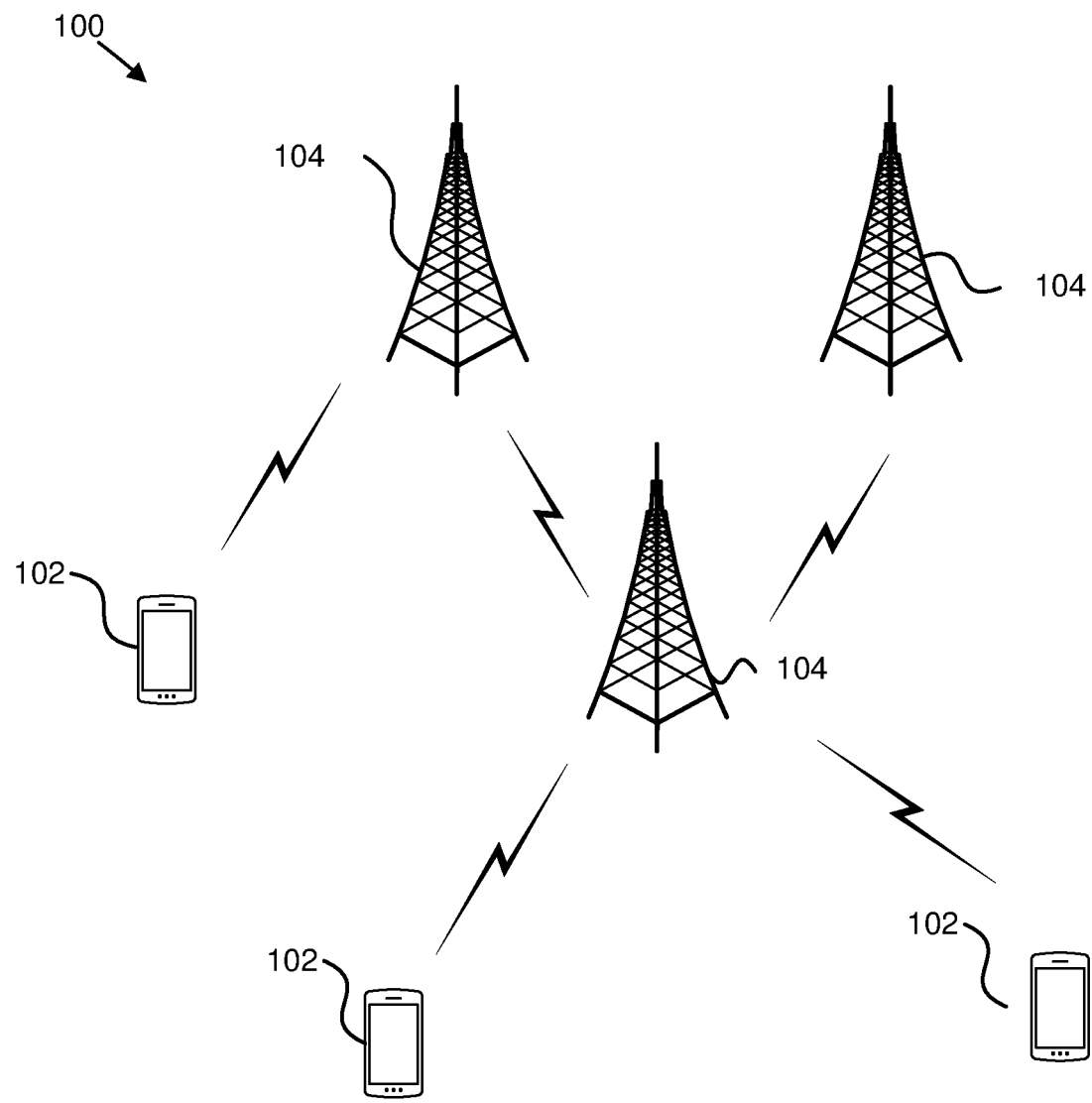
FIG. 1 is a schematic block diagram illustrating one embodiment of a wireless communication system for uplink power control.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for uplink power control. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive a first message that configures reception of scheduling information for a first maximum number of overlapping uplink transmissions for a serving cell, wherein each uplink transmission of the first maximum number of overlapping uplink transmissions for the serving cell corresponds to an uplink transmission beam pattern of a plurality of uplink transmission beam patterns or a spatial domain transmission filter of a plurality of spatial domain transmission filters. In some embodiments, the remote unit 102 may receive a second message that configures uplink power control parameters for each uplink beam pattern of the plurality of uplink transmission beam patterns or each spatial domain transmission filter of the plurality of spatial domain transmission filters. In certain embodiments, the remote unit 102 may receive scheduling information for a first plurality of overlapping uplink transmissions for the serving cell based on the configuration of the first message, wherein: a number of the first plurality of overlapping uplink transmissions is no more than the configured first maximum number of overlapping uplink transmissions; the first plurality of overlapping uplink transmissions comprises a first uplink transmission and a second uplink transmission; the first uplink transmission corresponds to a first uplink beam pattern of the plurality of uplink transmission beam patterns or a first spatial domain transmission filter of the plurality of spatial domain transmission filters; the second uplink transmission corresponds to a second uplink beam pattern of the plurality of uplink transmission beam patterns or a second spatial domain transmission filter of the plurality of spatial domain transmission filters; and the scheduling information comprises two transmit power control commands that are associated with a same closed-loop power control process. In various embodiments, the remote unit 102 may determine a first transmit power for the first uplink transmission based on a corresponding first set of uplink power control parameters. In some embodiments, the remote unit 102 may determine a second transmit power for the second uplink transmission based on a corresponding second set of uplink power control parameters. In certain embodiments, the remote unit 102 may perform the first uplink transmission using the first uplink transmission beam pattern or the first spatial domain transmission filter based on the first transmit power. In various embodiments, the remote unit 102 may perform the second uplink transmission using the second uplink transmission beam pattern or the second spatial domain transmission filter based on the second transmit power. Accordingly, the remote unit 102 may be used for uplink power control.

Figure 2:
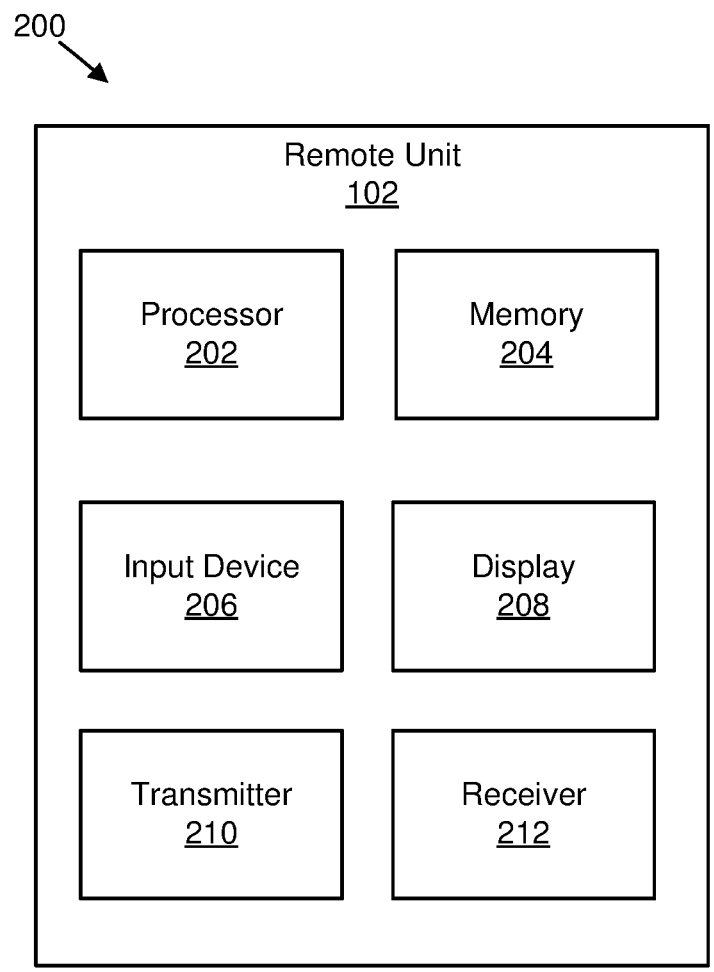
FIG. 2 is a schematic block diagram illustrating one embodiment of an apparatus that may be used for uplink power control.

FIG. 2 depicts one embodiment of an apparatus 200 that may be used for uplink power control. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine a first transmit power for a first uplink transmission based on a corresponding first set of uplink power control parameters; determine a second transmit power for a second uplink transmission based on a corresponding second set of uplink power control parameters; perform the first uplink transmission using a first uplink transmission beam pattern or a first spatial domain transmission filter based on the first transmit power; and perform the second uplink transmission using a second uplink transmission beam pattern or a second spatial domain transmission filter based on the second transmit power. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In some embodiments, the receiver 212 may: receive a first message that configures reception of scheduling information for a first maximum number of overlapping uplink transmissions for a serving cell, wherein each uplink transmission of the first maximum number of overlapping uplink transmissions for the serving cell corresponds to an uplink transmission beam pattern of a plurality of uplink transmission beam patterns or a spatial domain transmission filter of a plurality of spatial domain transmission filters; receive a second message that configures uplink power control parameters for each uplink beam pattern of the plurality of uplink transmission beam patterns or each spatial domain transmission filter of the plurality of spatial domain transmission filters; and receive scheduling information for a first plurality of overlapping uplink transmissions for the serving cell based on the configuration of the first message, wherein: a number of the first plurality of overlapping uplink transmissions is no more than the configured first maximum number of overlapping uplink transmissions; the first plurality of overlapping uplink transmissions comprises a first uplink transmission and a second uplink transmission; the first uplink transmission corresponds to a first uplink beam pattern of the plurality of uplink transmission beam patterns or a first spatial domain transmission filter of the plurality of spatial domain transmission filters; the second uplink transmission corresponds to a second uplink beam pattern of the plurality of uplink transmission beam patterns or a second spatial domain transmission filter of the plurality of spatial domain transmission filters; and the scheduling information comprises two transmit power control commands that are associated with a same closed-loop power control process. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
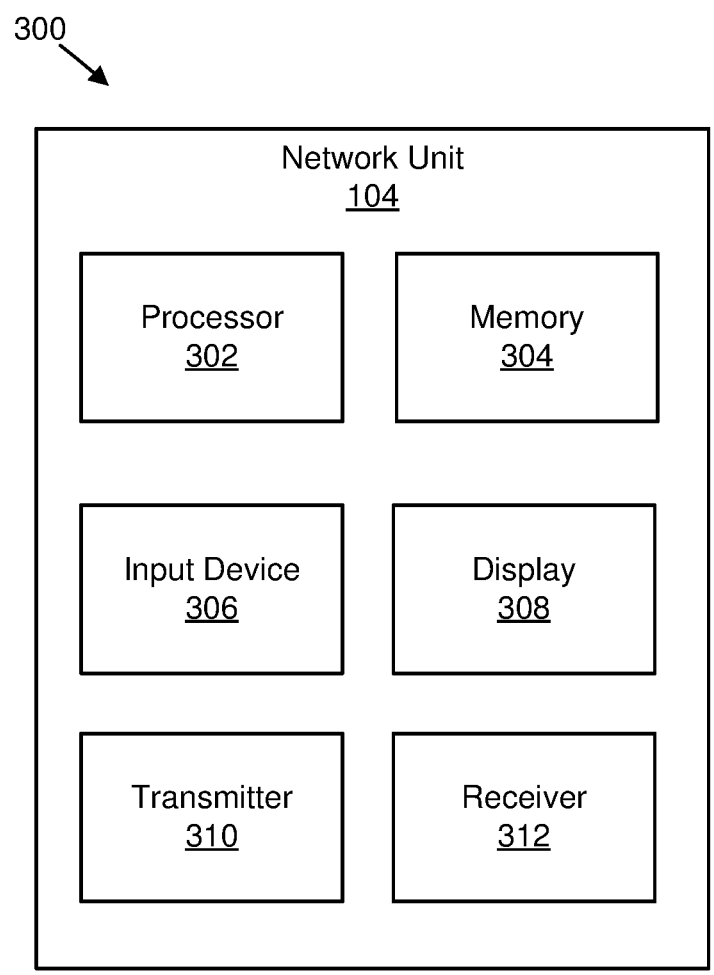
FIG. 3 is a schematic block diagram illustrating one embodiment of an apparatus that may be used for transmitting information.

FIG. 3 depicts one embodiment of an apparatus 300 that may be used for transmitting information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit information. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, communication between a UE and a network terminal (e.g., BS, eNB, gNB) may take place as a point-to-point communication (e.g., a single TX point and a single RX point). In certain embodiments, multi-antenna techniques may be used (e.g., MIMO). In such embodiments, TX and/or RX antennas may be collocated, all information and/or signal processing may be centralized, and/or signal processing may be performed by a fixed common entity.

In various embodiments, CoMP operations such as DPS and NCJT may enable a communication point not to be a single and/or fixed transmission and/or reception point. For example, in DPS, it may be possible to dynamically switch between multiple network TRPs belonging to a single serving cell or different serving cells, where only one TRP is active and/or operating at a time. As another example, in NCJT, two eNBs or two TRPs of a single eNB may simultaneously transmit two separate TBs (e.g., one TB from each TRP), and the UE may receive two TBs. In certain embodiments, both DPS and NCJT may use new DCI formats (e.g., DCI format 2D in LTE) that provide appropriate PDSCH resource mapping (e.g., rate-matching) and QCL information indication to ensure correct demodulation and decoding at the UE with respect to the multiple TRPs.

In some embodiments, CoMP operation in LTE may involve various assumptions and/or considerations: (i) ideal and/or non-ideal backhaul between two TRPs; (ii) an UE may operate with all UE panels (e.g., if multiple UE panels exist) and there may be no distinction between UE panels; and (iii) there may be network implementations to support CoMP operation on uplink such as SRS and DMRS signal generation that is not a function of a cell ID.

In certain embodiments, in eMIMO multiple TPR, panel, and/or beam transmission and reception may be at the gNB and/or the UE, such as with different backhaul assumptions. PDCCH and DCI for downlink and/or uplink may facilitate indication of multiple time-overlapping and/or simultaneous (e.g., or multiple one-at-a-time) downlink receptions from or multiple uplink transmissions to one or more TRPs and/or TRP panels by one or more UE panels. In various embodiments, both fast and/or ideal backhaul and slow and/or non-ideal backhaul may be used. In some embodiments, the following scenarios may occur: (i) multiple one-at-a-time uplink transmissions scheduled by a single PDCCH (e.g., with new DCI formats); and (ii) multiple time-overlapping and/or simultaneous uplink transmissions scheduled by a single PDCCH (e.g., with new DCI formats) or multiple PDCCHs (e.g., with existing DCI formats).

In some embodiments, identifiers for UE panels (e.g., implicit or explicit indication) may distinguish UE panels, such as for scenarios involving UE power saving (e.g., sending UE panels to "sleep" and then "waking up" UE panels based on a network indication and/or UE decision) and/or multi-panel uplink transmission (e.g., indicating which UE panels perform UL transmissions).

The following tables include information from TS 38.214:

TABLE 1

TS 38.214 Section 6.1.2.1 for PUSCH Slot Aggregation

When the UE is configured with aggregationFactorUL > 1, the same symbol allocation is applied across the aggregationFactorUL consecutive slots and the PUSCH is limited to a single transmission layer. The UE shall repeat the TB across the aggregationFactorUL consecutive slots applying the same symbol allocation in each slot. The redundancy version to be applied on the $n^{th}$ transmission occasion of the TB is determined according to table 6.1.2.1-2.
If the UE procedure for determining slot configuration, as defined in subclause 11.1 of [TS 38.213], determines symbols of a slot allocated for PUSCH as downlink symbols, the transmission on that slot is omitted for multi-slot PUSCH transmission.

TABLE 6.1.2.1-2

Redundancy version when aggregationFactorUL > 1

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TABLE 2

TS 38.213 Section 9.2.6 for PUCCH Repetition Procedure

For PUCCH formats 1, 3, or 4, a UE can be configured a number of slots, $N_{PUCCH}^{repeat}$, for a PUCCH transmission by respective higher layer parameters nrofSlots .
For $N_{PUCCH}^{repeat}$ >1,
the UE repeats the PUCCH transmission with the UCI over $N_{PUCCH}^{repeat}$ slots
a PUCCH transmission in each of the $N_{PUCCH}^{repeat}$ slots has a same number of consecutive symbols, as provided by higher layer parameter nrofSymbols in PUCCH-format1, nrofSymbols in PUCCH-format3, or nrofSymbols in PUCCH-format4
a PUCCH transmission in each of the $N_{PUCCH}^{repeat}$ slots has a same first symbol, as provided by higher layer parameter startingSymbolIndex in PUCCH-format1, startingSymbolIndex in PUCCH-format3, or startingSymbolIndex in PUCCH-format4
the UE is configured by higher layer parameter inter slotFrequencyHopping whether or not to perform frequency hopping for PUCCH transmissions in different slots
if the UE is configured to perform frequency hopping for PUCCH transmissions across different slots
the UE performs frequency hopping per slot
the UE transmits the PUCCH starting from a first PRB, provided by higher layer parameter startingPRB, in slots with even number and starting from the second PRB, provided by higher layer parameter secondHopPRB, in slots with odd number. The slot indicated to the UE for the first PUCCH transmission has number 0 and each subsequent slot until the UE transmits the PUCCH in $N_{PUCCH}^{repeat}$ slots is counted regardless of whether or not the UE transmits the PUCCH in the slot
the UE does not expect to be configured to perform frequency hopping for a PUCCH transmission within a slot
if the UE is not configured to perform frequency hopping for PUCCH transmissions across different slots and if the UE is configured to perform frequency hopping for PUCCH transmissions within a slot, the frequency hopping pattern between the first PRB and the second PRB is same within each slot
If the UE determines that, for a PUCCH transmission in a slot, the number of symbols available for the PUCCH transmission is smaller than the value provided by higher layer parameter nrofSymbols for the corresponding PUCCH format, the UE does not transmit the PUCCH in the slot.
If a UE is provided higher layer parameter TDD-UL-DL-ConfigurationCommon, or is additionally provided higher layer parameter TDD-UL-DL-ConfigDedicated, as described in Subclause 11.1, the UE determines the $N_{PUCCH}^{repeat}$ slots for a PUCCH transmission starting from a slot indicated to the UE as described in Subclause 9.2.3 and having an UL symbol or flexible symbol provided by higher layer parameter startingSymbolIndex in PUCCH-format1, or in PUCCH-format3, or in PUCCH-

TABLE 2-continued

TS 38.213 Section 9.2.6 for PUCCH Repetition Procedure format4 as a first symbol, and
consecutive UL symbols or flexible symbols, starting from the first symbol, equal to
or larger than a number of symbols provided by higher layer parameter nrofsymbols
in PUCCH-format1, or in PUCCH-format3, or in PUCCH-format4
If a UE is not provided higher layer parameter TDD-UL-DL-ConfigurationCommon, the
UE determines the $N_{PUCCH}^{repeat}$ slots for a PUCCH transmission as the $N_{PUCCH}^{repeat}$ consecutive slots
starting from a slot indicated to the UE as described in Subclause 9.2.3.
If a UE would transmit a PUCCH over a first number $N_{PUCCH}^{repeat} >1$ of slots and the UE would
transmit a PUSCH over a second number of slots, and the PUCCH transmission would
overlap with the PUSCH transmission in one or more slots, and the conditions in
Subclause 9.2.5 for multiplexing the UCI in the PUSCH are satisfied in the overlapping
slots, the UE transmits the PUCCH and does not transmit the PUSCH in the overlapping
slots.
A UE does not multiplex different UCI types in a PUCCH transmission with repetitions
over $N_{PUCCH}^{repeat} >1$ slots.
If a UE would transmit a first PUCCH over a first number $N_{PUCCH}^{repeat} >1$ of slots and a second
PUCCH over a second number of $N_{PUCCH}^{repeat} >1$ slots and the transmissions of the first
PUCCH and the second PUCCH would overlap in a third number of slots then, for the
third number of slots and with UCI type priority of HARQ-ACK > SR > CSI with higher
priority > CSI with lower priority,
the UE does not expect the first PUCCH and the second PUCCH to start at a same
slot and include a UCI type with same priority
if the first PUCCH and the second PUCCH include a UCI type with same priority,
the UE transmits the PUCCH starting at an earlier slot and does not transmit the
PUCCH starting at a later slot
if the first PUCCH and the second PUCCH do not include a UCI type with same
priority, the UE transmits the PUCCH that includes the UCI type with higher
priority and does not transmit the PUCCH that includes the UCI type with lower
priority
If a UE would transmit a PUCCH over $N_{PUCCH}^{repeat}$ slots and the UE does not transmit the
PUCCH in a slot from the $N_{PUCCH}^{repeat}$ slots due to overlapping with another PUCCH
transmission in the slot, the UE counts the slot in the number of $N_{PUCCH}^{repeat}$ slots.

TABLE 3

TS 38.213 Section 7.1.1

If a UE transmits a PUSCH on active UL BWP b of carrier f of serving cell c using
parameter set configuration with index j and PUSCH power control adjustment state with
index l, the UE determines the PUSCH transmission power $P_{PUSCH,b,f,c}(i, j, q_d, l)$ in PUSCH
transmission occasion i as $$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c} \end{cases}$$

[dBm]
...
For the PUSCH power control adjustment state $f_{b,f,c}(i, l)$ for active UL BWP b of
carrier f of serving cell c in PUSCH transmission occasion i
$\delta_{PUSCH,b,f,c}(i, l)$ is a TPC command value included in a DCI format 0_0 or DCI
format 0_1 that schedules the PUSCH transmission occasion i on active UL
BWP b of carrier f of serving cell c or jointly coded with other TPC commands
in a DCI format 2_2 with CRC scrambled by TPC-PUSCH-RNTI, as described in
Subclause 11.3
$l \in \{0, 1\}$ if the UE is configured with twoPUSCH-PC-AdjustmentStates and
l = 0 if the UE is not configured with twoPUSCH-PC-AdjustmentStates or if
the PUSCH transmission is scheduled by a RAR UL grant as described in
Subclause 8.3
For a PUSCH (re)transmission configured by ConfiguredGrantConfig, the
value of $l \in \{0, 1\}$ is provided to the UE by powerControlLoopToUse
If the UE is provided SRI-PUSCH-PowerControl, the UE obtains a
mapping between a set of values for the SRI field in DCI format 0_1 and
the l value(s) provided by sri-PUSCH-ClosedLoopIndex. If the PUSCH
transmission is scheduled by a DCI format 0_1 and if DCI format 0_1
includes a SRI field, the UE determines the l value that is mapped to the
SRI field value
If the PUSCH transmission is scheduled by a DCI format 0_0 or by a DCI
format 0_1 that does not include a SRI field, or if SRI-PUSCH-
PowerControl is not provided to the UE, l = 0

TABLE 3-continued

TS 38.213 Section 7.1.1

If the UE obtains one TPC command from a DCI format 2_2 with CRC
scrambled by a TPC-PUSCH-RNTI, the l value is provided by the closed
loop indicator field in DCI format 2_2

$$f_{b,f,c}(i, l) = f_{b,f,c}(i - i_0, l) + \sum_{m=0}^{C(D_i)-1} \delta_{PUSCH,b,f,c}(m, l) \text{ is the PUSCH power control adjustment}$$

state l for active UL BWP b of carrier f of serving cell c and PUSCH
transmission occasion i if the UE is not provided tpc-Accumulation, where
The $\delta_{PUSCH,b,f,c}$ values are given in Table 7.1.1-1

$$\sum_{m=0}^{C(D_i)-1} \delta_{PUSCH,b,f,c}(m, l) \text{ is a sum of TPC command values in a set } D_i \text{ of TPC}$$

command values with cardinality $C(D_i)$ that the UE receives between
$K_{PUSCH}(i - i_0) - 1$ symbols before PUSCH transmission occasion $i - i_0$ and
$K_{PUSCH}(i)$ symbols before PUSCH transmission occasion i on active UL BWP
b of carrier f of serving cell c for PUSCH power control adjustment state l,
where $i_0 > 0$ is the smallest integer for which $K_{PUSCH}(i - i_0)$ symbols before
PUSCH transmission occasion $i - i_0$ is earlier than $K_{PUSCH}(i)$ symbols before
PUSCH transmission occasion i
If a PUSCH transmission is scheduled by a DCI format 0_0 or DCI format
0_1, $K_{PUSCH}(i)$ is a number of symbols for active UL BWP b of carrier f of
serving cell c after a last symbol of a corresponding PDCCH reception and
before a first symbol of the PUSCH transmission
If a PUSCH transmission is configured by ConfiguredGrantConfig, $K_{PUSCH}(i)$
is a number of $K_{PUSCH,min}$ symbols equal to the product of a number of symbols
per slot, $N_{symb}^{slot}$, and the minimum of the values provided by k2 in PUSCH-
ConfigCommon for active UL BWP b of carrier f of serving cell c
If the UE has reached maximum power for active UL BWP b of carrier f of serving cell $c$ at PUSCH transmission occasion $i - i_0$ and $\sum_{m=0}^{C(D_i)-1} \delta_{PUSCH,b,f,c}(m, l) \geq 0$, then $f_{b,f,c}(i, l) = f_{b,f,c}(i - i_0, l)$
If UE has reached minimum power for active UL BWP b of carrier f of serving cell $c$ at PUSCH transmission occasion $i - i_0$ and $\sum_{m=0}^{C(D_i)-1} \delta_{PUSCH,b,f,c}(m, l) \leq 0$, then $f_{b,f,c}(i, l) = f_{b,f,c}(i - i_0, l)$
A UE resets accumulation of a PUSCH power control adjustment state l for
active UL BWP b of carrier f of serving cell c to $f_{b,f,c}(0, l) = 0$
If a configuration for a corresponding $P_{O\_UE\_PUSCH,b,f,c}(j)$ value is provided by
higher layers
If a configuration for a corresponding $\alpha_{b,f,c}(j)$ value is provided by higher
layers
If j > 1 and the PUSCH transmission is scheduled by a DCI format 0_1
that includes a SRI field, and the UE is provided SRI-PUSCH-
PowerControl, the UE determines the value of l from the value of j
based on an indication by the SRI field for a sri-PUSCH-
PowerControlId value associated with the sri-P0-PUSCH-AlphaSetId
value corresponding to j and with the sri-PUSCH-ClosedLoopIndex
value corresponding to l
If j > 1 and the PUSCH transmission is scheduled by a DCI format 0_0
or by a DCI format 0_1 that does not include a SRI field or the UE is not
provided SRI-PUSCH-PowerControl, l = 0
If j = 1, l is provided by the value of powerControlLoopToUse
$f_{b,f,c}(i, l) = \delta_{PUSCH,b,f,c}(i, l)$ is the PUSCH power control adjustment state for active
UL BWP b of carrier f of serving cell c and PUSCH transmission occasion i if
the UE is provided tpc-Accumulation, where
$\delta_{PUSCH,b,f,c}$ absolute values are given in Table 7.1.1-1

In one embodiment, if there are multiple UL transmissions (e.g., corresponding to PUSCH, PUCCH, and/or SRS regardless of whether there are time-overlaps, simultaneous transmissions, or no overlaps) scheduled by a single PDCCH, multiple PDCCHs, and/or predetermined UL transmission (e.g., periodic and/or semi-persistent SRS, PUCCH), a number of power control equations may be based on at least: (i) a number of transmitting UL panels and/or UL beam indications including SRIs, indicated PUCCH resources (e.g., each corresponding to a PUCCHSpatialRelationInfo), corresponding TPC commands indicated by PDCCH, SRS transmission, and/or combinations thereof; and/or (ii) a number of specified, calculated, and/or determined Pcmax, f, c values for UL transmission (e.g., a number of panel-specific Pcmax, f, c, s values, if any), a backhaul type (e.g., because of TPC accumulation), and/or a reliability of the UL transmissions (e.g., because of TPC accumulation).

In certain embodiments, for multiple non-overlapping UL transmissions scheduled by a single PDCCH and/or predetermined UL transmission (e.g., periodic and/or semi-persistent SRS, PUCCH), each transmitting UL panel and/or UL beam indication including SRIs, indicated PUCCH resources (e.g., each corresponding to a PUCCHSpatialRelationInfo) indicated by PDCCH, SRS transmission, and/or combinations thereof, along with a Pcmax, f, c value (i.e., not necessarily panel-specific) may define a separate PC equation for each UL transmission occasion. In such embodiments, a determined uplink power is based on OL, PL, and/or CL power control parameters based on configured mappings between UL beam indications (e.g., SRI, PUCCHSpatialRelationInfo, or SRS-SpatialRelationInfo) and the OL, PL, and/or CL power control parameters, numerology, resource allocation, MCS for those UL transmissions, and/or TPC commands.

In various embodiments, for multiple time-overlapping transmissions scheduled by a single PDCCH, multiple PDCCHs, and/or predetermined UL transmission (e.g., periodic and/or semi-persistent SRS, PUCCH), if no panel-specific Pcmax, f, c, s is specified (e.g., only the usual Pcmax, f, c is calculated by the UE), then only one power control equation may be defined that is based on a summation of all determined powers for each UL transmitting panel and/or beam, where the individual determined power is based on OL, PL, and/or CL power control parameters defined based on configured mappings between UL beam indications (e.g., SRI, PUCCHSpatialRelationInfo, or SRS-SpatialRelationInfo) and the OL, PL, and/or CL power control parameters, numerology, resource allocation, MCS for those UL transmissions, and/or TPC commands.

In some embodiments, for multiple time-overlapping transmission scheduled by a single PDCCH, multiple PDCCHs, and/or predetermined UL transmission (e.g., periodic and/or semi-persistent SRS, PUCCH), if panel-specific Pcmax, f, c, s is specified or calculated by a UE (e.g., per specified rules, or per UE implementation), then each UL transmission follows a separate individual PC equation based on an UL beam indication and corresponding OL, PL, and/or CL power control parameters, numerology, resource allocation, MCS for those UL transmissions, and/or TPC commands.

In certain embodiments, a maximum number of PC equations applied to multiple UL transmissions that are scheduled by a PDCCH or overlap in time may depend on (e.g., bounded by or equal to the maximum of): (i) a maximum number of UE UL transmitting panels that may be a UE capability; (ii) a maximum of number of gNB TRPS and/or panels that operate and/or serve the UE; (iii) a maximum number of PDCCHs that may be received and/or processed by the UE at the same time and/or time interval, such as a TTI, a slot, a mini slot, an aggregation of slots, mini-slots, and/or a predefined time period (e.g., based on a PUSCH preparation time such as a minimum or worst-case largest time taking into account a scheduled BWP and a scheduling BWP) that may be another UE capability; (iv) a maximum number of beam indication fields, resource indication fields, and/or TPC command fields indicated in PDCCH that may be a semi-statically configured value in RRC; and/or (iv) a maximum number of UL transmissions (e.g., channels and/or signals) that may overlap that may be a UE capability.

In various embodiments, each UL transmission may correspond to a PDCCH, a PDCCH part, a DCI, a DCI part, an indicated UL beam indication (e.g., SRI or PUCCHSpatialRelationInfo for indicated PUCCH resources or SRS-SpatialRelationInfo for SRS transmission), an indicated panel ID and/or index, and/or a configured UL grant.

In some embodiments, a numerology for UL transmissions may be based on the numerology of an active UL BWP. In various embodiments, MCS and resource allocation for each UL transmission may be indicated in corresponding fields in PDCCH. For example, resource allocation may be the same for all UL transmissions.

In certain embodiments, a number of OL, PL, and/or CL power control parameters configured for a UE in a serving cell (or uplink carrier, or bandwidth part) may be scaled with a number of UE UL panels so that potentially separate sets of OL, PL, and/or CL power control parameters may be configured for each UE UL panel per serving cell (or uplink carrier, or bandwidth part). In one example, for a UE with two UL (e.g., transmitting) panels, a UE may be configured with up to 2×2=4 CL-PC processes or up to 2×4=8 PL references.

In various embodiments, a number of OL, PL, and/or CL power control parameters configured for a UE in a serving cell (or uplink carrier, or bandwidth part) may be scaled with: (i) a maximum number of UE UL transmitting panels (may be a UE capability); (ii) a maximum number of gNB TRPS and/or panels that operate and/or serve the UE; (iii) a maximum number of PDCCHs that may be received and/or processed by the UE at the same time (or within a predefined time period) (may be another UE capability); (iv) a maximum number of beam indication fields, resource indication fields, and/or TPC command fields indicated in a single PDCCH that may semi-statically configure values in RRC; and/or (iv) a maximum number of UL transmissions (or channels, or signals) that may overlap (may be a UE capability).

In some embodiments, mappings may be per panel or per PDCCH (e.g., semi-statically configured mappings of SRI-PUSCH-PowerControl) that may include mappings from SRI to OL, PL, and/or CL power control parameters configured per panel index or per PDCCH. In various embodiments, SRI may implicitly or explicitly include a panel index or PDCCH index or may be independent of any such index.

In certain embodiments, a number of OL, PL, and/or CL power control parameters configured for a UE in a serving cell (or uplink carrier, or bandwidth part) may not scale with a number of UE UL panels. In such embodiments, the same up to 2 CL-PC processes or the same set of up to 4 PL references may be configured for the UE per serving cell (or uplink carrier, or bandwidth part) regardless of having one or two UL transmitting panels.

In various embodiments, a number of OL, PL, and/or CL power control parameters configured for a UE in a serving cell (or uplink carrier, or bandwidth part) may not scale with: (i) a maximum number of UE UL transmitting panels (may be a UE capability); (ii) a maximum number of gNB TRPs and/or panels that operate and/or serve the UE; (iii) a maximum number of PDCCHs that may be received and/or processed by the UE at the same time (or within a predefined time period) (may be another UE capability); (iv) a maximum number of beam indication fields, resource indication fields, and/or TPC command fields indicated in a single PDCCH that may semi-statically configure values in RRC; and/or (iv) a maximum number of UL transmissions (or channels, or signals) that may overlap (may be a UE capability).

In some embodiments, if a UE is capable of and is configured with multi-panel transmission, then the UE may be configured with multiple SRS-config configurations, one for each panel. In such embodiments, the UE may be configured with multiple PUSCH configurations, one for each panel. In certain embodiments, a UE may be configured only with a single SRS-Config and/or PUSCH-config (e.g., both common and dedicated), but there may be an indexing or index partitioning with respect to a panel index for a corresponding SRS resources used for PUSCH (e.g., a first panel may be configured as codebook-based, and a second panel may be configured as non-codebook-based, a first SRS resource set corresponds to the first panel, and a second SRS resource set corresponds to the second panel), and appropriate PUSCH parameters such as PUSCH power control parameters may be configured according to a configured mapping to SRI values.

In various embodiments, a panel-specific Pcmax (e.g., a configured maximum output power per UE UL panel) may be needed at least if multiple UL transmissions from different UE UL panels overlap in time partially or completely (e.g., simultaneous UL transmissions). In such embodiments, UL transmissions may be repetitions of the same TB and/or codeword, may be different TBs and/or codewords, the UL transmissions may be scheduled by a single PDCCH or multiple PDCCHs, the UL transmissions may be combinations of UL channels (e.g., PUSCH, PUCCH) and/or signals (e.g., SRS), and/or may be targeted at the same gNB TRP or different TRPs.

In some embodiments, for each serving cell and/or uplink carrier, a parameter for panel-specific Pcmax per UE UL panel index b may be defined as Pcmax, f, c, b, may depend on a UE power class and/or a panel-specific UE power class (e.g., depending on a size and number of antenna elements in an antenna array, sub-array, and/or panel), may depend on a configured panel-specific P_Emax, and/or may depend on panel-specific back-off terms such as panel-specific MPR, A-MPR, P-MPR, and/or Delta_Tc that may depend on individual resource allocation (e.g., a number of RBs and/or a scheduled MCS) for UL transmission from each UE UL panel. In certain embodiments, although individual UL transmission powers may be bounded by corresponding panel-specific Pcmax, f, c, b (e.g., because a sum b=all transmitting panels, Pcmax, f, c, b>Pcmax, f, c may happen), a summation of all determined transmission powers in a serving cell and/or uplink carrier may be constrained by a cell-specific Pcmax, f, c in that serving cell and/or uplink carrier such that the sum b=all transmitting panels, P_b<=Pcmax, f, c, where P_b denotes a determined power for each UL transmission from each transmitting panel. In such embodiments, if the cell-specific Pcmax, f, c is exceeded (e.g., a power-limited situation), then power scaling may be performed across UL transmitting panels. The UE may scale down a transmission power of different panels or may drop transmission of some panels based on: (a) up to a UE implementation; and/or (b) a specified rule (e.g., based on a priority rule) for the contents of the UL transmissions, a traffic type, and/or a service type (e.g., URLLC, eMBB) on different panels and/or equal power scaling or power scaling in proportion to resource allocation (e.g., number of scheduled RBs), Pcmax for each UL panel (e.g., possibly after appropriate normalization with respect to a reference modulation scheme), and/or power scaling in proportion to a determined (e.g., prior to any scaling) uplink transmission power for each UL transmission on each UE UL panel except if a set of UE UL panels in which UL transmission is dropped (e.g., if an allocated power after power scaling is less than a certain predetermined and/or configured threshold [X dBm], if the difference between the determined power before power scaling and the allocated power after power scaling is larger than a certain threshold [Y dB], or up to UE implementation). The power scaling may be based on a PSD difference between panels (e.g., scaling to reduce the PSD difference to be within a certain range). This power scaling may be similar to MPR, A-MPR, and/or Pcmax for inter-band CA or intra-band non-contiguous CA if UL transmission on different bands corresponds to different PAs.

In certain embodiments, no panel-specific Pcmax is defined, but Pcmax, f, c may be defined (e.g., not panel dependent) based on UE power class, P_Emax, using aggregate back-off terms such as aggregate MPR and/or A-MPR that may be defined with respect to an aggregate resource allocation (e.g., sum-RB allocated) across all transmitting panels. In one embodiment, if there are different modulation schemes used for different UL transmission on different UE UL panels, a weighted-sum-RB may be used with a normalization weighting factor with respect to a pre-determined modulation (e.g., QPSK). In this embodiment, different approaches may be used to determine individual and/or per-panel back-off terms such as MPR and/or A-MPR, and the corresponding Pcmax for each UE UL panel from the aggregate back-off terms such as aggregate MPR and/or A-MPR. In various embodiments, how to split and/or allocate aggregate back-off terms such as aggregate MPR and/or A-MPR among UE UL transmitting panels is up to UE implementation. In some embodiments, a certain rule is specified for how to split and/or allocate aggregate back-off terms such as aggregate MPR and/or A-MPR among UE UL transmitting panels (e.g., equal individual back-off or back-off in proportion to the resource allocation such as a number of scheduled RBs for each UL panel possibly after normalization with respect to a reference modulation scheme and/or based on a priority rule for the contents of the UL transmissions, a traffic type, and/or a service type (e.g., URLLC vs. eMBB) on different panels). In certain embodiments, no individual back-off terms such as aggregate MPR and/or A-MPR and therefore no individual and/or panel-specific Pcmax per panel may be defined. In such embodiments, only a sum of UL transmission power across all transmitting UE UL panels may not exceed a usual (e.g., not panel dependent) Pcmax, f, c. Furthermore, in such embodiments, if the aggregate determined uplink power across all transmitting panels exceeds Pcmax, f, c, the UE may scale down the transmission power of different panels or may drop transmission of some of the panels based on: (a) up to a UE implementation; and/or (b) a specified rule, such as a priority rule, for the contents of the UL transmissions, a traffic type, and/or a service type (e.g., URLLC vs. eMBB) on different panels, equal power scaling or power scaling in proportion to resource allocation such as a number of scheduled RBs, Pcmax for each UL panel (such as after normalization with respect to a reference modulation scheme), and/or power scaling in proportion to a determined uplink transmission power for each UL transmission on each UE UL panel except if a set of UE UL panels in which UL transmission is dropped (e.g., if the allocated power after power scaling is less than a certain predetermined and/or configured threshold [X dBm], if the difference between the determined power before power scaling and the allocated power after power scaling is larger than a certain threshold [Y dB], or up to UE implementation). The power scaling may be based on a PSD difference between panels (e.g., scaling to reduce the PSD difference to be within a certain range).

In various embodiments, if a panel-specific Pcmax, f, c, b is specified or is determined by a UE per specified rules, panel-specific PH may be defined as a difference between a panel-specific Pcmax, f, c, b and a determined UL transmission power for each UE UL transmitting panel. In such embodiments, each real PHR may include the PH value and the individual panel-specific Pcmax, f, c, b. For virtual PHR, individual panel-specific Pcmax, f, c, b may be omitted and may not be reported. In some embodiments, a number of PHRs for each cell may be related to a number of PDCCHs, a number of panels, and/or a UE capability.

In certain embodiments, a UE may be configured in a PHR MAC-CE format with a number of PHRs per serving cell and/or uplink carrier in which a number of PHRs may be one or may be more than one. If there is more than one PHR, a number of PHRs may depend upon a UE capability and/or the configured value for: a number of PDCCHs that the UE may receive within a slot or within a small separation in time, an extension level in a DCI format for multiple-panel transmission in a single PDCCH (e.g., a number of indicated SRIs or indicated TPC commands), a number of UE panels, a maximum number of UE panels that may simultaneously transmit, a maximum number of simultaneous transmissions by the UE, and/or a number of gNB TRPS that the UE is configured to operate with.

In certain embodiments, PHR is defined as a function of a difference between a set of panel-specific Pcmax, f, c, b and determined UL transmission powers for corresponding UE UL transmitting panels.

In one embodiment, PHR is defined as a minimum of a difference between a set of panel-specific Pcmax, f, c, b and determined UL transmission powers for corresponding UE UL transmitting panels.

In another embodiment, PHR is defined as a function of a difference between a set of panel-specific Pcmax, f, c, b and determined UL transmission powers for corresponding UE UL transmitting panels. In such an embodiment, the set is of panel-specific Pcmax, f, c, b includes: panels scheduled by a gNB for the UL transmission in a determined period of time (e.g., one TTI); panels indicated by DCI and/or higher layer signaling (e.g., such as MAC-CE/RRC); and/or panels determined by the UE (e.g., associated with transmissions corresponding to a TB).

In one embodiment, PHR may be reported for only one Panel (e.g., one PHR per serving cell). In some embodiments, a panel index corresponding to a PHR report may be included in a PHR format. In certain embodiments, if a set of OL, PL, and/or CL power control parameters may be configured for each UE UL panel per serving cell and/or uplink carrier. In such embodiment, some preconfigured set of OL, PL, and/or CL parameters may be defined for the calculation of a virtual PHR. In various embodiments, a virtual PHR for a serving cell and/or carrier configured with multiple UL transmitting panels and with multiple sets of OL, PL, and/or CL power control parameters (e.g., one for each UL transmitting panel) may be calculated by using the OL, PL, and/or CL power control parameters corresponding to a first transmitting panel. In some embodiments, a UE may have at least the following options regarding how to compute a virtual PHR for a serving cell (e.g., or uplink carrier): option (a)—using OL, PL, and/or CL power control parameters corresponding to a transmitting panel with a lowest index; option (b)—using the OL, PL, and/or CL power control parameters corresponding to a transmitting panel with a highest index; option (c)—using the OL, PL, and/or CL power control parameters corresponding to a transmitting panel on which a latest UL transmission was performed; option (d)—using the OL, PL, and/or CL power control parameters corresponding to a transmitting panel on which an UL transmission was the latest started and/or finished; option (e)—using the OL, PL, and/or CL power control parameters corresponding to a transmitting panel on which UL transmission is scheduled by an earliest and/or latest grant performed; and/or option (f)—using the OL, PL, and/or CL power control parameters corresponding to a transmitting panel on which an UL transmission has a smallest duration, a largest duration, a smallest TTI length, and/or a largest TTI length.

In various embodiments, if a UE reports multiple PHR per serving cell and/or uplink carrier and if the UE may report actual PHR for a number of UL transmission from a number of UL panels that is smaller than a number of configured PHR reports in a MAC-CE format (e.g., 2 PHRs are needed but only 1 actual PHR is available), then the other PHRs may be reported as virtual PHR. In such embodiments, the UE may have at least the following options regarding how to compute those virtual PHRs for that serving cell or uplink carrier: option (a)—using OL, PL, and/or CL power control parameters corresponding to a panel with a lowest index, excluding the transmitting panels; option (b)—using the OL, PL, and/or CL power control parameters corresponding to a panel with a highest index, excluding the transmitting panels; option (c)—using the OL, PL, and/or CL power control parameters corresponding to panels on which a latest UL transmission was performed, excluding the transmitting panels; option (d)—using the OL, PL, and/or CL power control parameters corresponding to a transmitting panel on which UL transmission was last started and/or finished for UL transmission, excluding the transmitting panels; option (e)—using the OL, PL, and/or CL power control parameters corresponding to a transmitting panel on which UL transmission is scheduled and/or performed by an earliest and/or latest grant, excluding the transmitting panels; and/or option (f)—using the OL, PL, and/or CL power control parameters corresponding to a transmitting panel on which UL transmission has a smallest duration, a largest duration, a smallest TTI length, and/or a largest TTI length, excluding the transmitting panels.

In certain embodiments, a panel index corresponding to a PHR report may be included in a PHR format. In some embodiments, if a UE is configured with multiple PHRs per serving cell and/or uplink carrier, if a number of actual Type-1 PHRs that the UE may report is smaller than the number of PHRs configured in a PHR MAC-CE format for a serving cell and/or uplink carrier, if a certain UE panel is configured only for SRS with usage other than codebook and noncodebook (e.g., no PUSCH configured for a panel), and/or if the UE can report actual Type-3 PHR for SRS transmission on that panel, then the UE may report actual Type-3 PHR as one of the PHR entries instead of a virtual PHR. In such embodiments, a panel index may be included in the PHR format.

In various embodiments, if a set of OL, PL, and/or CL power control parameters is configured separately for each UL transmitting panel per serving cell and/or uplink carrier, a path loss variation for one serving cell and/or carrier may be assessed between a pathloss measured at a present time on one of the current pathloss references—to consider whether simultaneous transmissions on multiple panels occurs at the present time—and a pathloss measured at a transmission time of a last transmission of PHR on the pathloss references in use at that time, irrespective of whether the pathloss reference has changed in between.

In certain embodiments, if a set of OL, PL, and/or CL power control parameters is configured separately for each UL transmitting panel per serving cell and/or uplink carrier, a path loss variation for one serving cell and/or carrier may be assessed between a pathloss measured at a present time on a current pathloss reference with a lowest and/or highest index—to consider instances in which simultaneous transmissions on multiple panels occur at a present time—and a pathloss measured at a transmission time of a last transmission of PHR on the pathloss references in use at that time, irrespective of whether the pathloss reference has changed in between.

In some embodiments, a path loss variation for one serving cell and/or carrier configured with multiple panels may be assessed per transmitting panel (e.g., a pathloss measured at a present time on a current pathloss reference of a panel and a pathloss measured at a transmission time of a last transmission of PHR on the pathloss reference in use at that time), irrespective of whether the pathloss reference has changed in between for that panel. A PHR may be triggered if phr-ProhibitTimer expires or has expired and the path loss has changed more than phr-Tx-PowerFactorChange dB for at least one panel of an activated serving cell of any MAC entity that is used as a pathloss reference since the last transmission of a PHR in this MAC entity if the MAC entity has UL resources for new transmission.

In various embodiments, a number of PHR periodic and prohibit timers for multi-panel transmission (e.g., regardless of one PHR or multiple PHRs) is one. In certain embodiments, a number of PHR periodic and prohibit timers for multi-panel transmission for one PHR and/or multiple PHRs may increase as a function of a number of UE panels, a number of gNB TRPs, a UE capability corresponding to a maximum number of PDCCHs, a size of new DCI formats, a maximum number of simultaneous transmissions (e.g., including uplink channel and/or signals), and so forth. In some embodiments, a number of PHR periodic and prohibit timers for multi-panel transmissions may be equal to a number of PHRs configured in a PHR MAC-CE format In various embodiments, all PHR reports for multi-panel transmission for a serving cell and/or uplink carrier may be communicated on all overlapping PUSCH transmissions within that serving cell and/or uplink carrier (e.g., aimed to be transmitted to both TRPs, such as to improve PHR reliability. In one embodiment, only one PUSCH transmission from among simultaneous and/or time overlapping PUSCH transmissions contains all PHR reports for multi-panel transmission for a serving cell and/or uplink carrier. For example, the PUSCH transmission that is scheduled first, the PUSCH transmission that starts first, the PUSCH transmission that ends first, the PUSCH transmission that has the smallest duration, the largest duration, the smallest TTI length, and/or the largest TTI length, the PUSCH transmission that has the highest reliability (e.g., in terms of target BLER, MCS, etc.), or the PUSCH transmission that has not been interrupted (e.g., because of SRS switching or an UL pre-emption indication). In some embodiments, if there are multiple PHRs per serving cell and/or uplink carrier for multi-panel transmission, each actual PHR may be sent to each TRP (e.g., on a corresponding PUSCH), and all virtual PHRs may be communicated on a single default choice of PUSCH. In such embodiments, a panel index may be included in the PHR format.

In certain embodiments, a panel-specific Pcmax, f, c, b may not be specified or determined by a UE per specified rules and panel-specific PHR may not be defined. In such embodiments, PHR may be defined as the difference between a exiting (not panel-dependent) Pcmax, f, c and a summation of all determined UL transmission powers across all UE UL transmitting panels.

In various embodiments, if a PHR is to be transmitted (e.g., a periodic timer expires), a UE may send a PHR over all or a subset (>1) of TRPs. In such embodiments, if the UE prepares a first PUSCH corresponding to a first TRP in a first time instance and prepares a second PUSCH corresponding to a second TRP in a second time instance, and if the difference between the first and second time instance is smaller than a threshold or if the first time instance and second time instance belong to the same time interval (e.g., same slot), the same PHR may be transmitted along with the first PUSCH and the second PUSCH.

In certain embodiments, even if no panel-specific Pcmax, f, c, b is available, two and/or multiple separate PHRs may be defined and reported for multi-panel transmission.

In some embodiments, 2 PHRs may be used if 2 simultaneous beams are from 2 different UE antenna panels. In various embodiments, NR may support configuring a UE with a max [N] groups of PL-reference resources in which N is related to a number of UE antenna panels. For a given group of PL-reference resources, the UE maintains one PHR prohibit timer and triggers a PHR if there is a significant PL change (e.g., an old gNB beam and a new gNB beam for PL comparison are from the same PL-reference resource group). With an active antenna array, a different UE antenna panel may mean a different PA. Each antenna panel may have a different max output power depending on a number of antenna elements and an output power of each antenna element. If 2 simultaneous UE beams are from the same UE antenna panel, only one PHR may be used. For example, PHR=P{c,max, antenna panel}–Tx power for UE beam 1–Tx power for UE beam 2.

In various embodiments, a panel-specific Pcmax may be defined in terms of panel combinations, sets, virtualization, exclusion (e.g., sleeping panels), and so forth. For example, Pcmax may be defined for a subset of panels with certain indexes or orientations, or Pcmax for an operation of all UE panels except for one and/or multiple panels that are in "sleep" for power saving reasons.

In one embodiment, for two or more UL transmissions of a UE in a same serving cell, uplink carrier, and/or bandwidth part there may be several options for how to update an accumulated closed-loop process based on the TPC commands included in the PDCCH, in which: a) the UL transmissions are scheduled by a same PDCCH (regardless of a specific DCI design, such as a single DCI with extended and/or additional fields, corresponding to second and higher UL transmissions, a single two-part and/or two-stage DCI, two DCIs, etc.) regardless of whether the UL transmissions correspond to a same TB and/or codeword (e.g., a repetition scenario) or different TBs and/or codewords; b) the UL transmission do not overlap in time (e.g., one at a time); and c) the UL transmissions correspond to a same closed-loop power control process (e.g., two or more PUSCH transmissions whose PUSCH beam indications and/or SRIs corresponds to the same closed-loop power control process index 'l', such as being based on a higher layer configured mapping sri-PUSCH-ClosedLoopIndex inside an RRC parameter SRI-PUSCH-PowerControl).

In certain embodiments, all TPC commands included in a PDCCH may be applied to a first UL transmission occasion and then the same CL-PC accumulation may be maintained for all remaining UL transmission occasions scheduled by that PDCCH.

In various embodiments, TPC commands may be applied one-by-one to PUSCH transmission occasions (e.g., a first TPC command may be applied for a first PUSCH occasion scheduled by a PDCCH, and a second TPC command may be applied (further accumulated) for a second PUSCH occasion, and so forth).

In some embodiments, only a subset of TPC commands are applied and/or accumulated, and the rest of the TPC commands are discarded (e.g., only the first and/or last TPC commands are applied, and then the same CL-PC accumulation is maintained without accumulating any other TPC commands indicated in that PDCCH).

In certain embodiments, all bit fields in PDCCH corresponding to TPC commands may be appended and/or interpreted as a single "extended" TPC command field (e.g., two 2-bit TPC commands may be considered as a single extended 4-bit TPC command). In such embodiments, the extended TPC command represents a CL-PC adjustment state level from a new TPC command table with extended range (e.g., −4 dB to 4 dB) and/or extended precision (e.g., 1 dB steps).

As may be appreciated, TPC commands described herein may be on top of any applicable group-common TPC commands received on DCI format 2_2 with CRC scrambled by a TPC-PUSCH-RNTI for a CL-PC process index l as provided by a closed loop indicator field in DCI format 2_2.

In various embodiments, a UE may not expect to be scheduled by a same PDCCH for two or more non-overlapping (e.g., one at a time) UL transmissions in a same serving cell, uplink carrier, and/or bandwidth part in which those UL transmissions correspond to a same closed-loop power control process.

In some embodiments, a UE may not expect to receive more than one non-zero TPC command for two or more non-overlapping (e.g., one at a time) UL transmissions that are scheduled by a same PDCCH in a same serving cell, uplink carrier, and/or bandwidth part if those UL transmissions correspond to a same closed-loop power control process.

In certain embodiments, for a first UL transmission on a first panel s1 and a second UL transmission on a second panel s2 (e.g., both scheduled by a same PDCCH), and if the first UL transmission and the second UL transmission: a) are in a same serving cell, uplink carrier, and/or bandwidth part regardless of whether the UL transmissions correspond to a same TB and/or codeword (e.g., a repetition scenario) or different TBs and/or codewords; b) partially or completely (e.g., simultaneous) overlap in time; c) correspond to a same closed-loop power control process (e.g., two or more PUSCH transmissions whose PUSCH beam indications and/or SRIs correspond to a same closed-loop power control process index 'l' that may be based on a higher layer configured mapping sri-PUSCH-ClosedLoopIndex inside an RRC parameter SRI-PUSCH-PowerControl); and d) the UE has reached at an UL transmission occasion i–i$_0$ either maximum panel-specific power Pcmax_f, c, s1(i–i0) for panel s1 or maximum panel-specific power Pcmax_f, c, s2(i–i0) for panel s2, then all indicated TPC commands in the PDCCH (as well as any applicable group-common TPC commands provided in DCI format 2_2) may be discarded. This may only apply if a panel-specific Pcmax is specified, defined, and/or calculated by a UE (e.g., per specified rules or per UE implementation).

In various embodiments, for two or more UL transmissions of a UE in a same serving cell, uplink carrier, and/or bandwidth part that: a) are scheduled by a same PDCCH regardless of a specific DCI design (e.g., a single DCI with extended fields, a single two-part and/or two-stage DCI, two DCIs, etc.), and regardless of whether the UL transmissions correspond to a same TB and/or codeword (e.g., a repetition scenario) or different TBs and/or codewords; b) do not overlap in time (e.g., one at a time); and c) correspond to a same closed-loop process (e.g., two or more PUSCH transmissions whose PUSCH beam indications and/or SRIs correspond to the same closed-loop power control process index 'l' that may be based on a higher layer configured mapping sri-PUSCH-ClosedLoopIndex inside an RRC parameter SRI-PUSCH-PowerControl), then there may be several options for how to update the absolute closed-loop process based on TPC commands included in the PDCCH.

In some embodiments, a function of TPC commands indicated in PDCCH (e.g., the smallest TPC command, the largest TPC command, an average (e.g., weighted average) of the TPC commands), is applied to a first UL transmission occasion and then the same CL-PC adjustment status is maintained for all remaining UL transmission occasions scheduled by that PDCCH.

In certain embodiments, TPC commands are applied one-by-one to PUSCH transmission occasions. For example, the first TPC command is applied for the first PUSCH occasion scheduled by the PDCCH, the second TPC command is applied (e.g., without accumulation) to the second PUSCH occasion, and so forth.

In various embodiments, only a subset of TPC commands are applied and the rest of the TPC commands indicated in PDCCH are discarded (e.g., only the first TPC command is applied and then the same CL-PC adjustment status is maintained for all remaining UL transmission occasions scheduled by the PDCCH).

In some embodiments, all bit fields in PDCCH corresponding to TPC commands are appended and interpreted as a single (e.g., extended) TPC command field (e.g., two 2-bit TPC commands are considered as a single extended 4-bit TPC command). In such embodiments, the TPC command represents a CL-PC adjustment state level from a TPC command table with extended range (e.g., −4 dB to 4 dB) and/or extended precision (e.g., 1 dB steps).

In certain embodiments, TPC commands as described herein may be in addition to any applicable group-common TPC commands received on DCI format 2_2 with CRC scrambled by a TPC-PUSCH-RNTI for a CL-PC process index l (e.g., as provided by a closed loop indicator field in DCI format 2_2).

In various embodiments, a UE may not be scheduled by a PDCCH used for two or more non-overlapping (e.g., one at a time) UL transmissions in the same serving cell, uplink carrier, and/or bandwidth part in which those UL transmissions correspond to the same closed-loop power control process.

In some embodiments, a UE may not receive more than one non-zero TPC command for two or more non-overlapping (e.g., one at a time) UL transmissions that are scheduled by the same PDCCH in a same serving cell, uplink carrier, and/or bandwidth part if those UL transmissions correspond to the same closed-loop power control process.

In certain embodiments, for a first UL transmission on a first panel s1 and a second UL transmission on a second panel s2 (both scheduled by the same PDCCH), and if the first UL transmission and the second UL transmission: 1) are in the same serving cell, uplink carrier, and/or bandwidth part, regardless of whether the UL transmissions correspond to the same TB and/or codeword (e.g., a repetition scenario), or different TBs and/or codewords; 2) partially or completely (e.g., simultaneous) overlap in time; 3) correspond to a same closed-loop power control process (e.g., two or more PUSCH transmissions whose PUSCH beam indications and/or SRIs correspond to the same closed-loop power control process index 'l'—such as by being based on a higher layer configured mapping sri-PUSCH-ClosedLoopIndex inside an RRC parameter SRI-PUSCH-PowerControl); and 4) a UE has reached at UL transmission occasion $i-i_0$ either maximum panel-specific power Pcmax_f, c, s1(i–i0) for panel s1 or maximum panel-specific power Pcmax_f, c, s2(i–i0) for panel s2; then all indicated TPC commands in the PDCCH (as well as any applicable group-common TPC commands provided in DCI format 2_2) are discarded. Such embodiments may be applicable only if a panel-specific Pcmax is specified or is defined and/or calculated by the UE (e.g., per specified rules or per UE implementation).

In various embodiments, for two or more UL transmissions of a UE in the same serving cell, uplink carrier, and/or bandwidth part that: 1) are scheduled by the same PDCCH (e.g., regardless of a specific DCI design such as with: a single DCI with extended fields, a single two-part and/or two-stage DCI, two DCIs, and so forth), regardless of whether the UL transmissions correspond to the same TB and/or codeword (e.g., a repetition scenario), or different TBs and/or codewords; 2) partially or completely (e.g., simultaneous) overlap in time; and 3) correspond to the same closed-loop power control process (e.g., two or more PUSCH transmissions whose PUSCH beam indications and/or SRIs correspond to the same closed-loop power control process index 'l'—such as by being based on a higher layer configured mapping sri-PUSCH-ClosedLoopIndex inside an RRC parameter SRI-PUSCH-PowerControl); then there may be various ways to update an accumulated and/or absolute closed-loop process based on TPC commands included in the PDCCH.

In some embodiments, a summation of all TPC commands included in a PDCCH may be applied for overlapping UL transmission occasion.

In certain embodiments, a certain function of TPC commands indicated in PDCCH may be applied to overlapping UL transmissions (e.g., a smallest TPC command, a largest TPC command, and/or an average (e.g., a weighted average) of the TPC commands is applied to the overlapping UL transmissions.

In various embodiments, TPC commands are applied to PUSCH transmission occasions one-by-one (e.g., a first subset of TPC commands is applied to a first PUSCH occasion scheduled by a PDCCH, and a second subset of TPC commands is applied to a second PUSCH occasion—the second PUSCH occasion starts after the start of the first PUSCH occasion, and so forth).

In some embodiments, only a subset of TPC commands or a function thereof are applied and the rest of the TPC commands are discarded (e.g., only the first and/or last TPC command is applied).

In certain embodiments, all bit fields in PDCCH corresponding to TPC commands are appended and interpreted as a single (e.g., extended) TPC command field (e.g., two 2-bit TPC commands are considered as a single extended 4-bit TPC command). In such embodiments, the TPC command represents a CL-PC adjustment state level from a TPC command value table with an extended range (e.g., –4 dB to 4 dB) and/or an extended precision (e.g., 1 dB steps). As may be appreciated, the TPC commands described herein may be applied in addition to any applicable group-common TPC commands received on DCI format 2_2 with CRC scrambled by a TPC-PUSCH-RNTI for the CL-PC process index l as provided by the closed loop indicator field in DCI format 2_2.

In various embodiments, a UE may not be scheduled by the same PDCCH for two or more UL transmissions in the same serving cell, uplink carrier, and/or bandwidth part that partially or completely (e.g., simultaneous) overlap in time if those different UL transmissions correspond to the same closed-loop power control process In some embodiments, a UE may not expect to receive more than one non-zero TPC command for two or more UL transmissions that are scheduled by the same PDCCH in the same serving cell, uplink carrier, and/or bandwidth part that partially or completely (e.g., simultaneous) overlap in time if those UL transmissions correspond to the same closed-loop power control process.

In certain embodiments, for a first UL transmission on a first panel s1 and a second UL transmission on a second panel s2 with both scheduled by the same PDCCH, and if the first UL transmission and the second UL transmission: 1) are in the same serving cell, uplink carrier, and/or bandwidth part, regardless of whether the UL transmissions correspond to the same TB and/or codeword (e.g., a repetition scenario) or different TBs and/or codewords; 2) partially or completely (e.g., simultaneous) overlap in time; 3) correspond to the same closed-loop power control process (e.g., two or more PUSCH transmissions whose PUSCH beam indications and/or SRIs corresponds to the same closed-loop power control process index 'l'—such as by being based on a higher layer configured mapping sri-PUSCH-ClosedLoopIndex inside an RRC parameter SRI-PUSCH-PowerControl; and 4) the UE has reached at UL transmission occasion $i-i_0$ either maximum panel-specific power Pcmax_f, c, s1(i–i0) for the first panel s1 or maximum panel-specific power Pcmax_f, c, s2(i–i0) for the second panel s2; then all indicated TPC commands in the PDCCH (as well as any applicable group-common TPC commands provided in DCI format 2_2) are discarded. As may be appreciated, various embodiments described herein may apply only if a panel-specific Pcmax is specified or is defined and/or calculated by the UE (per specified rules or per UE implementation).

In various embodiments, for two or more UL transmissions of a UE in the same serving cell, uplink carrier, and/or bandwidth part that: 1) are scheduled by multiple PDCCHs, regardless of a specific DCI design such as independent DCIs and/or dependent DCIs, and/or regardless of whether the UL transmissions correspond to the same TB and/or codeword (e.g., a repetition scenario) or different TBs and/or codewords; and 2) partially or completely (e.g., simultaneous) overlap in time; 3) correspond to the same closed-loop power control process (e.g., two or more PUSCH transmissions whose PUSCH beam indications and/or SRIs corresponds to the same closed-loop power control process index 'l' such as by being based on a higher layer configured mapping sri-PUSCH-ClosedLoopIndex inside an RRC parameter SRI-PUSCH-PowerControl; then there may be several options for how to update an accumulated and/or absolute closed-loop process based on the TPC commands included in the PDCCH as described herein.

In some embodiments, a summation of all TPC commands included in corresponding PDCCHs may be applied to the first and/or earliest overlapping UL transmission occasion, and then the same CL-PC adjustment status may be maintained.

In certain embodiments, a function of TPC commands indicated in a PDCCH may be applied to overlapping UL transmissions (e.g., a smallest TPC command, a largest TPC command, or an average (e.g., weighted average) of the TPC commands may be applied to first and/or earliest overlapping UL transmissions), and then the same CL-PC adjustment status may be maintained.

In various embodiments, TPC commands may be applied to PUSCH transmission occasions one-by-one (e.g., a first subset of TPC commands is applied to a first PUSCH occasion scheduled by a PDCCH, and a second subset of TPC commands is applied to a second PUSCH occasion—the second PUSCH occasion starts after the start of the first PUSCH occasion, and so forth).

In some embodiments, only a subset of TPC commands or a function thereof may be applied and the rest of the TPC commands may be discarded (e.g., only the first and/or last TPC command is applied).

In certain embodiments, all bit fields in a PDCCH corresponding to TPC commands may be appended and interpreted as a single (e.g., extended) TPC command field (e.g., two 2-bit TPC commands may be considered as a single extended 4-bit TPC command), where the TPC command represents a CL-PC adjustment state level from a TPC command value table with extended range (e.g., −4 dB to 4 dB) and/or extended precision (e.g., 1 dB steps). The TPC command may be applied to the first and/or earliest overlapping UL transmission occasion, and then the same CL-PC adjustment status may be maintained. It should be noted that the TPC commands as described herein may be on top of any applicable group-common TPC commands received on DCI format 2_2 with CRC scrambled by a TPC-PUSCH-RNTI for the CL-PC process index l as provided by the closed loop indicator field in DCI format 2_2.

In various embodiments, a UE is not expected to receive more than one non-zero TPC command for two or more UL transmissions that are scheduled by different PDCCH in a same serving cell, uplink carrier, and/or bandwidth part that partially or completely (e.g., simultaneous) overlap in time if those UL transmissions correspond to the same closed-loop power control process.

In some embodiments, for a first UL transmission scheduled by a first PDCCH on a first panel s1, and for a second UL transmission scheduled by a second PDCCH on a second panel s2, and if the first UL transmission and the second UL transmission: 1) are in the same serving cell, uplink carrier, and/or bandwidth part, regardless of whether the UL transmissions correspond to the same TB and/or codeword (e.g., a repetition scenario) or different TBs and/or codewords; 2) partially or completely (e.g., simultaneous) overlap in time; 3) correspond to the same closed-loop power control process (e.g., two or more PUSCH transmissions whose PUSCH beam indications and/or SRIs corresponds to the same closed-loop power control process index 'l' such as by being based on a higher layer configured mapping sri-PUSCH-ClosedLoopIndex inside an RRC parameter SRI-PUSCH-PowerControl); and 4) the UE has reached at UL transmission occasion $i-i_0$ either maximum panel-specific power Pcmax_f, c, s1(i−i0) for the first panel s1 or maximum panel-specific power Pcmax_f, c, s2(i−i0) for the second panel s2; then the indicated TPC commands in the first PDCCH and the second PDCCH (as well as any applicable group-common TPC commands provided in DCI format 2_2) may be discarded. It should be noted that embodiments described herein may apply only if a panel-specific Pcmax is specified or is defined and/or calculated by the UE (e.g., per specified rules or per UE implementation).

In certain embodiments, if two or more PUSCH transmissions (e.g., with or without an overlap in time) are scheduled by a single PDCCH including a variant of DCI format 0_0 (e.g., DCI with extended fields, a two-part and/or two-stage DCI, etc.), a UE may transmit each PUSCH according to the spatial relation corresponding to a PUCCH resource with certain IDs within an active UL BWP of each carrier and serving cell. In such embodiments, certain IDs may be a subset of lowest indices for PUCCH resources in which the size of the subset is equal to the number of PUSCH transmissions. In various embodiments, a UE may use the same RS resource index $q_d$ for pathloss reference for PUSCH transmissions as for PUCCH transmissions in PUCCH resources with those indices. It should be noted that the UE may not expect PUSCH scheduled by DCI format 0_0 in a BWP without a configured PUCCH resource with PUCCH-SpatialRelationInfo in frequency range 2 in RRC connected mode.

In some embodiments, if there are two or more overlapping PUSCH transmissions scheduled by multiple PDCCHs including a variant of DCI format 0_0 (e.g., DCI with extended fields, a two-part and/or two-stage DCI, etc.), a UE may transmit each PUSCH according to a spatial relation corresponding to a PUCCH resource having IDs within an active UL BWP of each carrier and/or serving cell. In such embodiments, the IDs may be a subset of lowest indices for PUCCH resources in which the size of the subset is equal to a number of PUSCH transmissions. In such embodiments, the UE may use the same RS resource index $q_d$ for pathloss reference for PUSCH transmission as for PUCCH transmission in the PUCCH resources with those indices. As may be appreciated, the UE may not expect PUSCH scheduled by DCI format 0_0 in a BWP without configured a PUCCH resource with PUCCH-SpatialRelationInfo in frequency range 2 in an RRC connected mode In certain embodiments, if there are two or more overlapping PUSCH transmissions scheduled by a single PDCCH including a variant of DCI format 0_0 (e.g., DCI with extended fields, a two-part and/or two-stage DCI, etc.) or by multiple PDCCHs including a variant of DCI format 0_0 (e.g., DCI with extended fields, a two-part and/or two-stage DCI, etc.), and if each panel has a separate PUCCH configuration, then a UE may transmit each PUSCH on each transmitting panel according to the spatial relation corresponding to a PUCCH resource with the lowest ID configured for the corresponding panel within an active UL BWP of each carrier and serving cell. In such embodiments, a UE uses the same RS resource index $q_d$ for pathloss reference for those PUSCH transmission as for PUCCH transmission in corresponding PUCCH resources with the lowest index configured for the corresponding panel. It should be noted that the UE may not expect PUSCH scheduled by DCI format 0_0 in a BWP without configured PUCCH resource with PUCCH-SpatialRelationInfo in frequency range 2 in RRC connected mode.

In various embodiments, if there are two or more overlapping PUSCH transmissions scheduled by a single PDCCH including a variant of DCI format 0_0 (e.g., DCI with extended fields, a two-part and/or two-stage DCI, etc.) or by multiple PDCCHs including a variant of DCI format 0_0 (e.g., DCI with extended fields, a two-part and/or two-stage DCI, etc.), such that there is no PUSCH beam indication in PDCCH, and if MAC-CE activates two or more PUCCH SpatialRelationInfo values (e.g., from among a list of 8 or more configured PUCCH SpatialRelationInfo values) for each PUCCH resource, for each PUCCH resource set, or for all resource sets, then a UE may transmit each PUSCH on each transmitting panel according to the two and/or multiple activated spatial relations corresponding to the PUCCH resource with the lowest ID within an active UL BWP of each carrier and serving cell. In such an embodiment, the UE uses the same RS resource index $q_d$ for pathloss reference for those PUSCH transmission as for the PUCCH transmissions of a corresponding PUCCH resource with the lowest index. It should be noted that the UE may not expect PUSCH scheduled by DCI format 0_0 in a BWP without a configured PUCCH resource with PUCCH-SpatialRelationInfo in frequency range 2 in an RRC connected mode.

In some embodiments, a UE does not expect to be scheduled for multiple PUSCH transmissions by a single PDCCH (e.g., with a new or extended format) or by multiple PDCCHs that contain no spatial relation filter indication.

In certain embodiments, a UE may simultaneously transmit multiple PUCCH resources with the same or different payloads and/or with the same or different PUCCH beams (e.g., MAC-CE activated PUCCHSpatialRelationInfo). In such embodiments, the UE may: 1) transmit multiple SRs to different TRPs; (ii) transmit each HARQ-ACK to its corresponding TRP; (iii) transmit each CSI to its corresponding TRP; and/or (iv) transmit the same and/or repeated UCI to different TRPs using the same and/or different beams. In such embodiments, PUCCH resource indices may be indicated in PDCCH scheduling PDSCH (e.g., PUCCH resource for HARQ-ACK, aperiodic and/or semi-persistent CSI and/or UCI on PUCCH). In such embodiments, multiple PUCCH power control equations may be considered with each equation based on OL, PL, and/or CL power control parameters configured in an activated PUCCHSpatialRelationInfo for the indicated PUCCH resources.

In various embodiments, a MAC-CE may activate two or more PUCCH SpatialRelationInfo values (e.g., from among a list of 8 or more configured PUCCH SpatialRelationInfo values) for each PUCCH resource, for each PUCCH resource set, or for all resource sets. In such embodiments, this may occur for a single common PUCCH-config for all UE panels. In such embodiments, each of the two or more activated PUCCH SpatialRelationInfo values correspond to a transmission of a PUCCH resource from a transmitting UE panel.

In some embodiments, a UE may make two or more PUCCH transmissions of the same PUCCH resource with the same payload content (e.g., for transmitting all UCI bits corresponding to all TRPs in a single transmission) or with different payload contents (e.g., for transmitting the UCI bits corresponding to each TRP only to that TRP) using two or more different PUCCH SpatialRelationInfo values activated by a MAC-CE for that PUCCH resource. In such embodiments, the two or more transmissions may be simultaneous (e.g., full time overlap), have partial overlap in time, or no overlap in time.

In certain embodiments, if there are multiple PDCCHs and/or DCIs that schedule multiple time-overlapped and/or simultaneous transmissions: a UE capability may be defined and/or considered to determine whether the UE is able to process two or more PDCCHs and/or DCIs received at the same time, within a slot, or with small time differences (e.g., less than a certain fixed and/or/configurable number of symbols and/or mini-slots) such that the two or more PDCCHs and/or DCIs are not dropped (e.g., because of PUSCH processing time or blind decoding requirements and/or implementation).

In various embodiments, PDSCH preparation time may get relaxed and/or increased if there are multiple downlink receptions scheduled by a single PDCCH or multiple PDCCHs (e.g., that are received within a slot or within a certain configured and/or specified time separation) so that new tables of UE capability for an N1 parameter with increased values may be needed if processing multiple PDSCHs. In some embodiments, UE implementation may be improved to keep up with an existing capability and PDSCH processing time formula and/or numbers.

In certain embodiments, several scheduling constraints may apply to multiple PDCCHs that schedule multiple UL transmission. In certain embodiments, a UE may not expect to be scheduled by multiple PDCCHs for multiple time-overlapped and/or simultaneous UL transmissions with the same spatial transmit filter (e.g., regardless of the same TB repetition or different TBs).

In various embodiments, a UE may not expect to receive two or more PDCCHs and/or DCIs for two or more UL transmission (or downlink receptions) that include BWP-switching commands transmitted to different UL BWPs (or different DL BWPs). In some embodiments, if there are multiple PUSCH transmissions (regardless of whether a single PDCCH or multiple PDCCH are used), a UE expects that a BWP switch command is a common parameter in any DCI type (e.g., one-part, two-part, independent, dependent, etc.). In such embodiments, the UE may not expect multiple parts of a DCI or multiple DCIs to provide different BWP switch commands.

In some embodiments, for scheduling multiple UL transmissions in a multi-TRP, panel, and/or beam, the following aspects may be considered: single PDCCH or multiple PDCCH; single TB (repetition) or multiple TBs; time-overlapped, simultaneous, non-overlapped, and/or one-at-a-time; and/or the same beam, panel, and/or TRP or different beam, panel, and/or TRP (e.g., if a beam is used to refer to a spatial transmission filter).

In various embodiments, any combination of the following factors may be considered: 1) a single PDCCH, a single TB (repetition), one-at-a-time, and a single beam; 2) multiple PDCCHs, a single TB (repetition), one-at-a-time, and a single beam (e.g., multiple PDCCHs are used for improved reliability of PDCCH reception such as for a service type and/or traffic type with higher reliability requirement (URLLC)—mainly aimed at sub-6 GHz (frequency range 1) to facilitate single beam and/or panel transmission—in one example, different PDCCHs may have the same K2 value (e.g., time from UL grant to first UL transmission) but an indicated number of repetitions and/or aggregation level may be smaller for later PDCCHs—in another example, different PDCCHs may indicate the same number of repetitions and/or aggregation level, but different K2 values (e.g., time from UL grant to first UL transmission) so that later PDCCHs indicate a smaller K2 value); 3) a single PDCCH, a single TB (repetition), one-at-a-time, and different beams (e.g., DCI format to include multiple SRIs and TPCs—in one example, there may be one SRI field that maps to a set of multiple SRS resources (or antenna ports, or antenna port groups) based on a configured, specified, and/or predetermined mapping—multiple transmissions may be contiguous in time (e.g., consecutive time slots)); 4) multiple PDCCHs, a single TB (repetition), one-at-a-time, and different beams (a new and/or extended version of HARQ retransmission in which PDCCH transmission for HARQ is not based on ACK-NACK from a network (so, retransmission may occur without gNB feedback)—multiple transmission may not be contiguous in time (e.g., not consecutive time slots, there may be gaps between transmissions)—in one example, multiple PDCCHs may be used to increase the reliability of PDCCH reception); 5) a single PDCCH, a single TB (repetition), time-overlapped and/or simultaneous, and a same beam (same time and spatial settings cannot be separated and/or considered as multiple transmissions); 6) multiple PDCCHs, a single TB (repetition), time-overlapped and/or simultaneous, and the same beam (same time and spatial settings cannot be separated and/or considered as multiple transmissions)—implies a scheduling restriction and/or expectation by a UE to drop such DCI and/or PDCCH combination; 7) a single PDCCH, a single TB (repetition), time-overlapped and/or simultaneous, and different beams (a corresponding DCI format may include multiple SRIs and TPCs—in one example, a codeword to layer mapping (e.g., allocating coded bits across layers, then frequency, then time) may change so that each transmission on each layer is allocated a different RV and may be self-decodable); 8) multiple PDCCHs, a single TB (repetition), time-overlapped and/or simultaneous, different beams—for non-ideal backhaul; 9) a single PDCCH, multiple TBs, time-overlapped and/or simultaneous, multiple beams—may include a DCI format that includes multiple RV and NDI fields in addition to multiple SRI and TPC fields and the HARQ-ID may be a single field; 10) multiple PDCCHs, multiple TBs, time-overlapped and/or simultaneous, multiple beams—each PDCCH may include a regular DCI format, however, there may be a requirement to search via blind decoding for multiple PDCCHs (e.g., does not stop blind decoding after finding and/or detecting a first PDCCH); 11) a single PDCCH, multiple TBs, one-at-a-time, and a single beam—for scheduling in TDD as well as for unlicensed spectrum (e.g., LAA); 12) a single PDCCH, multiple TBs, one-at-a-time, and multiple beams—for scheduling in TDD as well as for unlicensed spectrum (e.g., LAA); 13) multiple PDCCHs, multiple TBs, one-at-a-time, and a single beam—use each PDCCH for each UL TX; 13) multiple PDCCHs, multiple TBs, one-at-a-time, and multiple beams—use each PDCCH for each UL TX (all time and/or spatial resources may be disjointed); 14) a single PDCCH, multiple TBs, time-overlapped and/or simultaneous, and a single beam—this may be an extension of UL MIMO such that more than 4 layers is supported so that 2 TBs are generated; and/or 15) multiple PDCCHs, multiple TBs, time-overlapped and/or simultaneous, and a single beam (same time and spatial settings may not be separated and/or considered as multiple transmissions)—implies a scheduling restriction and/or expectation by the UE to drop such DCI and/or PDCCH combination. In various embodiments, all factors and cases described herein may be used for DL and/or UL.

In some embodiments, for single PDCCH for multiple PUSCH transmissions, regardless of how a panel index is captured in DCI (e.g., SRI or a different parameter), an indication of a UE panel index may be available in DCI. In certain embodiments, if one-part of DCI has a fixed size, a panel index may be omitted for overhead reduction (e.g., DCI fields may be ordered based on UE panel index). In various embodiments, if one-part of DCI has a fixed size, a panel index may not be omitted (e.g., if some UL TXs correspond to transmissions by the same UE panel but in different times, such as repetitions). In some embodiments, if two-part DCI is used, a panel index may be one of the individual parameters in part 2 (e.g., which may be a parameter such as SRI, or an extension thereof). In one embodiment, for multiple PDCCHs for multiple PUSCH transmissions, a repeated doubled, folded, and/or jumbo DCI may be used so that multiple doubled, folded, and/or jumbo DCIs (e.g., which may include control information for all [N] UL TXs) may be repeated (e.g., to improve DCI reception reliability such as for URLLC).

Figure 4:
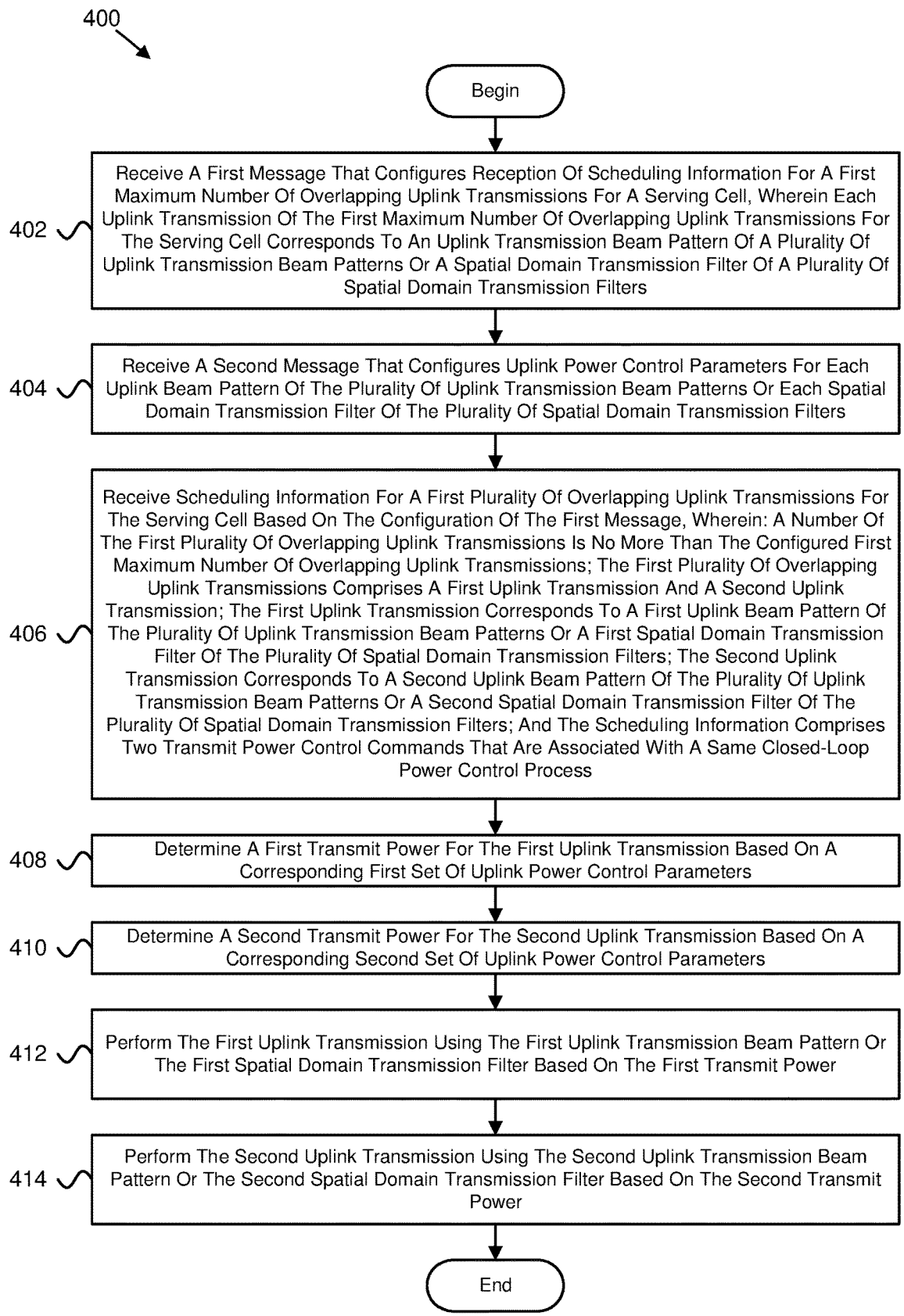
FIG. 4 is a flow chart diagram illustrating one embodiment of a method for uplink power control.

FIG. 4 is a flow chart diagram illustrating one embodiment of a method 400 for uplink power control. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include receiving 402 a first message that configures reception of scheduling information for a first maximum number of overlapping uplink transmissions for a serving cell, wherein each uplink transmission of the first maximum number of overlapping uplink transmissions for the serving cell corresponds to an uplink transmission beam pattern of a plurality of uplink transmission beam patterns or a spatial domain transmission filter of a plurality of spatial domain transmission filters. In some embodiments, the method 400 includes receiving 404 a second message that configures uplink power control parameters for each uplink beam pattern of the plurality of uplink transmission beam patterns or each spatial domain transmission filter of the plurality of spatial domain transmission filters. In certain embodiments, the method 400 includes receiving 406 scheduling information for a first plurality of overlapping uplink transmissions for the serving cell based on the configuration of the first message, wherein: a number of the first plurality of overlapping uplink transmissions is no more than the configured first maximum number of overlapping uplink transmissions; the first plurality of overlapping uplink transmissions comprises a first uplink transmission and a second uplink transmission; the first uplink transmission corresponds to a first uplink beam pattern of the plurality of uplink transmission beam patterns or a first spatial domain transmission filter of the plurality of spatial domain transmission filters; the second uplink transmission corresponds to a second uplink beam pattern of the plurality of uplink transmission beam patterns or a second spatial domain transmission filter of the plurality of spatial domain transmission filters; and the scheduling information comprises two transmit power control commands that are associated with a same closed-loop power control process. In various embodiments, the method 400 includes determining 408 a first transmit power for the first uplink transmission based on a corresponding first set of uplink power control parameters. In some embodiments, the method 400 includes determining 410 a second transmit power for the second uplink transmission based on a corresponding second set of uplink power control parameters. In certain embodiments, the method 400 includes performing 412 the first uplink transmission using the first uplink transmission beam pattern or the first spatial domain transmission filter based on the first transmit power. In various embodiments, the method 400 includes performing 414 the second uplink transmission using the second uplink transmission beam pattern or the second spatial domain transmission filter based on the second transmit power.

In certain embodiments, the method 400 further comprises transmitting a report of a user equipment capability for receiving scheduling information for a second maximum number of overlapping of uplink transmissions for the serving cell, wherein the configured first maximum number of overlapping of uplink transmissions is less than or equal to the second maximum number of overlapping of uplink transmissions. In some embodiments, the method 400 further comprises determining a first configured maximum output power corresponding to the first uplink transmission beam pattern or the first spatial domain transmission filter, and determining a second configured maximum output power corresponding to the second uplink transmission beam pattern or the second spatial domain transmission filter, wherein the first configured maximum output power and the second configured maximum output power are based on the scheduling information.

In various embodiments, the first transmit power is determined based on the first configured maximum output power and the second transmit power is determined based on the second configured maximum output power. In one embodiment, each uplink transmission of the first plurality of overlapping uplink transmissions is associated with a user equipment antenna panel. In certain embodiments, the first uplink transmission and the second uplink transmission are in a same bandwidth part of a same uplink carrier of the serving cell.

In some embodiments, the scheduling information comprises one or more physical downlink control channels. In various embodiments, each uplink transmission beam pattern of the plurality of uplink transmission beam patterns is associated with a reference signal resource of a set of reference signal resources of a plurality of sets of reference signal resources, and each set of reference signal resources of the plurality of sets of reference signal resources comprises a number of downlink reference signal resources or a number of uplink sounding reference signal resources. In one embodiment, each set of reference signal resources of the plurality of sets of reference signal resources is associated with a user equipment antenna panel.

In certain embodiments, the first uplink transmission beam pattern is different from the second uplink transmission beam pattern. In some embodiments, the method 400 further comprises reporting a power headroom report, wherein the power headroom report comprises one power headroom for the serving cell corresponding to the first uplink transmission and the second uplink transmission, and the power headroom report comprises a first power headroom corresponding to the first uplink transmission and a second power headroom corresponding to the second uplink transmission. In various embodiments, in response to the one power headroom being calculated with respect to a reference format, the one power headroom corresponds to a user equipment panel having a lowest index value among a plurality of antenna panels the user equipment operates with, or a set of reference signal resources having a lowest index value among a plurality of sets of reference signal resource.

In one embodiment, the power headroom report comprising the first power headroom and the second power headroom is transmitted on only one of the first uplink transmission and the second uplink transmission that corresponds to a user equipment panel having a lowest index among a plurality of antenna panels the user equipment operates with, or a set of reference signal resources having a lowest index among a plurality of sets of reference signal resource. In certain embodiments, the method 400 further comprises reporting a first power headroom report including a first power headroom corresponding to the first uplink transmission and reporting a second power headroom report including a second power headroom corresponding to the second uplink transmission, wherein the first power headroom report is transmitted on the first uplink transmission and the second power headroom report is transmitted on the second uplink transmission.

In some embodiments, the closed-loop power control process is updated based on one of at least the following: only a first transmit power control command of the two transmit power control commands is accumulated and a second transmit power control command of the two transmit power control commands is discarded; a summation of the two transmit power control commands is accumulated and applied to the first uplink transmission and maintained for the second uplink transmission; and two transmit power control command fields are concatenated to form a single extended transmit power control command field with a larger range, a larger resolution, or a combination thereof.

In various embodiments, in response to the scheduling information not containing an indication for an uplink beam pattern, the first uplink transmission follows a first spatial transmission filter for a first uplink control channel resource, the second uplink transmission follows a second spatial transmission filter for a second uplink control channel resource, and the first uplink control channel resource is different from the second uplink control channel resource. In one embodiment, the method 400 further comprises transmitting a report of a user equipment capability supporting a second maximum number of overlapping uplink transmissions with different transmission beam patterns or different spatial domain transmission filters for the serving cell, wherein the configured first maximum number of overlapping of uplink transmissions is less than or equal to the second maximum number of overlapping uplink transmissions.

In certain embodiments, a user equipment is not expected to receive scheduling information for the second uplink transmission that corresponds to the second uplink beam pattern or the second spatial domain transmission filter that is same as the first uplink beam pattern or the first spatial domain transmission filter corresponding to the first uplink transmission. In some embodiments, the method 400 further comprises: operating a user equipment with a plurality of user equipment antenna panels; and receiving an indication indicating at least a first user equipment antenna panel of the plurality of user equipment antenna panels operates in a power saving mode; wherein each uplink transmission of the first plurality of uplink transmissions is associated with a user equipment antenna panel other than the at least first user equipment antenna panel indicated to operate in power saving mode.

In various embodiments, the user equipment is not expected to receive scheduling information for an uplink transmission that corresponds to an uplink beam pattern or a spatial domain transmission filter associated with a user equipment antenna panel among the at least first user equipment antenna panel indicated to operate in power saving or low power mode.

In one embodiment, a method comprises: receiving a first message that configures reception of scheduling information for a first maximum number of overlapping uplink transmissions for a serving cell, wherein each uplink transmission of the first maximum number of overlapping uplink transmissions for the serving cell corresponds to an uplink transmission beam pattern of a plurality of uplink transmission beam patterns or a spatial domain transmission filter of a plurality of spatial domain transmission filters; receiving a second message that configures uplink power control parameters for each uplink beam pattern of the plurality of uplink transmission beam patterns or each spatial domain transmission filter of the plurality of spatial domain transmission filters; receiving scheduling information for a first plurality of overlapping uplink transmissions for the serving cell based on the configuration of the first message, wherein: a number of the first plurality of overlapping uplink transmissions is no more than the configured first maximum number of overlapping uplink transmissions; the first plurality of overlapping uplink transmissions comprises a first uplink transmission and a second uplink transmission; the first uplink transmission corresponds to a first uplink beam pattern of the plurality of uplink transmission beam patterns or a first spatial domain transmission filter of the plurality of spatial domain transmission filters; the second uplink transmission corresponds to a second uplink beam pattern of the plurality of uplink transmission beam patterns or a second spatial domain transmission filter of the plurality of spatial domain transmission filters; and the scheduling information comprises two transmit power control commands that are associated with a same closed-loop power control process; determining a first transmit power for the first uplink transmission based on a corresponding first set of uplink power control parameters; determining a second transmit power for the second uplink transmission based on a corresponding second set of uplink power control parameters; performing the first uplink transmission using the first uplink transmission beam pattern or the first spatial domain transmission filter based on the first transmit power; and performing the second uplink transmission using the second uplink transmission beam pattern or the second spatial domain transmission filter based on the second transmit power.

In certain embodiments, the method further comprises transmitting a report of a user equipment capability for receiving scheduling information for a second maximum number of overlapping of uplink transmissions for the serving cell, wherein the configured first maximum number of overlapping of uplink transmissions is less than or equal to the second maximum number of overlapping of uplink transmissions.

In some embodiments, the method further comprises determining a first configured maximum output power corresponding to the first uplink transmission beam pattern or the first spatial domain transmission filter, and determining a second configured maximum output power corresponding to the second uplink transmission beam pattern or the second spatial domain transmission filter, wherein the first configured maximum output power and the second configured maximum output power are based on the scheduling information.

In various embodiments, the first transmit power is determined based on the first configured maximum output power and the second transmit power is determined based on the second configured maximum output power.

In one embodiment, each uplink transmission of the first plurality of overlapping uplink transmissions is associated with a user equipment antenna panel.

In certain embodiments, the first uplink transmission and the second uplink transmission are in a same bandwidth part of a same uplink carrier of the serving cell.

In some embodiments, the scheduling information comprises one or more physical downlink control channels.

In various embodiments, each uplink transmission beam pattern of the plurality of uplink transmission beam patterns is associated with a reference signal resource of a set of reference signal resources of a plurality of sets of reference signal resources, and each set of reference signal resources of the plurality of sets of reference signal resources comprises a number of downlink reference signal resources or a number of uplink sounding reference signal resources.

In one embodiment, each set of reference signal resources of the plurality of sets of reference signal resources is associated with a user equipment antenna panel.

In certain embodiments, the first uplink transmission beam pattern is different from the second uplink transmission beam pattern.

In some embodiments, the method further comprises reporting a power headroom report, wherein the power headroom report comprises one power headroom for the serving cell corresponding to the first uplink transmission and the second uplink transmission, and the power headroom report comprises a first power headroom corresponding to the first uplink transmission and a second power headroom corresponding to the second uplink transmission.

In various embodiments, in response to the one power headroom being calculated with respect to a reference format, the one power headroom corresponds to a user equipment panel having a lowest index value among a plurality of antenna panels the user equipment operates with, or a set of reference signal resources having a lowest index value among a plurality of sets of reference signal resource.

In one embodiment, the power headroom report comprising the first power headroom and the second power headroom is transmitted on only one of the first uplink transmission and the second uplink transmission that corresponds to a user equipment panel having a lowest index among a plurality of antenna panels the user equipment operates with, or a set of reference signal resources having a lowest index among a plurality of sets of reference signal resource.

In certain embodiments, the method further comprises reporting a first power headroom report including a first power headroom corresponding to the first uplink transmission and reporting a second power headroom report including a second power headroom corresponding to the second uplink transmission, wherein the first power headroom report is transmitted on the first uplink transmission and the second power headroom report is transmitted on the second uplink transmission.

In some embodiments, the closed-loop power control process is updated based on one of at least the following: only a first transmit power control command of the two transmit power control commands is accumulated and a second transmit power control command of the two transmit power control commands is discarded; a summation of the two transmit power control commands is accumulated and applied to the first uplink transmission and maintained for the second uplink transmission; and two transmit power control command fields are concatenated to form a single extended transmit power control command field with a larger range, a larger resolution, or a combination thereof.

In various embodiments, in response to the scheduling information not containing an indication for an uplink beam pattern, the first uplink transmission follows a first spatial transmission filter for a first uplink control channel resource, the second uplink transmission follows a second spatial transmission filter for a second uplink control channel resource, and the first uplink control channel resource is different from the second uplink control channel resource.

In one embodiment, the method further comprises transmitting a report of a user equipment capability supporting a second maximum number of overlapping uplink transmissions with different transmission beam patterns or different spatial domain transmission filters for the serving cell, wherein the configured first maximum number of overlapping of uplink transmissions is less than or equal to the second maximum number of overlapping uplink transmissions.

In certain embodiments, a user equipment is not expected to receive scheduling information for the second uplink transmission that corresponds to the second uplink beam pattern or the second spatial domain transmission filter that is same as the first uplink beam pattern or the first spatial domain transmission filter corresponding to the first uplink transmission.

In some embodiments, the method further comprises: operating a user equipment with a plurality of user equipment antenna panels; and receiving an indication indicating at least a first user equipment antenna panel of the plurality of user equipment antenna panels operates in a power saving mode; wherein each uplink transmission of the first plurality of uplink transmissions is associated with a user equipment antenna panel other than the at least first user equipment antenna panel indicated to operate in power saving mode.

In various embodiments, the user equipment is not expected to receive scheduling information for an uplink transmission that corresponds to an uplink beam pattern or a spatial domain transmission filter associated with a user equipment antenna panel among the at least first user equipment antenna panel indicated to operate in power saving or low power mode.

In one embodiment, an apparatus comprises: a receiver that: receives a first message that configures reception of scheduling information for a first maximum number of overlapping uplink transmissions for a serving cell, wherein each uplink transmission of the first maximum number of overlapping uplink transmissions for the serving cell corresponds to an uplink transmission beam pattern of a plurality of uplink transmission beam patterns or a spatial domain transmission filter of a plurality of spatial domain transmission filters; receives a second message that configures uplink power control parameters for each uplink beam pattern of the plurality of uplink transmission beam patterns or each spatial domain transmission filter of the plurality of spatial domain transmission filters; and receives scheduling information for a first plurality of overlapping uplink transmissions for the serving cell based on the configuration of the first message, wherein: a number of the first plurality of overlapping uplink transmissions is no more than the configured first maximum number of overlapping uplink transmissions; the first plurality of overlapping uplink transmissions comprises a first uplink transmission and a second uplink transmission; the first uplink transmission corresponds to a first uplink beam pattern of the plurality of uplink transmission beam patterns or a first spatial domain transmission filter of the plurality of spatial domain transmission filters; the second uplink transmission corresponds to a second uplink beam pattern of the plurality of uplink transmission beam patterns or a second spatial domain transmission filter of the plurality of spatial domain transmission filters; and the scheduling information comprises two transmit power control commands that are associated with a same closed-loop power control process; and a processor that: determines a first transmit power for the first uplink transmission based on a corresponding first set of uplink power control parameters; determines a second transmit power for the second uplink transmission based on a corresponding second set of uplink power control parameters; performs the first uplink transmission using the first uplink transmission beam pattern or the first spatial domain transmission filter based on the first transmit power; and performs the second uplink transmission using the second uplink transmission beam pattern or the second spatial domain transmission filter based on the second transmit power.

In certain embodiments, the apparatus further comprises a transmitter that transmits a report of the apparatus capability for receiving scheduling information for a second maximum number of overlapping of uplink transmissions for the serving cell, wherein the configured first maximum number of overlapping of uplink transmissions is less than or equal to the second maximum number of overlapping of uplink transmissions.

In some embodiments, the processor determines a first configured maximum output power corresponding to the first uplink transmission beam pattern or the first spatial domain transmission filter, determines a second configured maximum output power corresponding to the second uplink transmission beam pattern or the second spatial domain transmission filter, and the first configured maximum output power and the second configured maximum output power are based on the scheduling information.

In various embodiments, the first transmit power is determined based on the first configured maximum output power and the second transmit power is determined based on the second configured maximum output power.

In one embodiment, each uplink transmission of the first plurality of overlapping uplink transmissions is associated with an apparatus antenna panel.

In certain embodiments, the first uplink transmission and the second uplink transmission are in a same bandwidth part of a same uplink carrier of the serving cell.

In some embodiments, the scheduling information comprises one or more physical downlink control channels.

In various embodiments, each uplink transmission beam pattern of the plurality of uplink transmission beam patterns is associated with a reference signal resource of a set of reference signal resources of a plurality of sets of reference signal resources, and each set of reference signal resources of the plurality of sets of reference signal resources comprises a number of downlink reference signal resources or a number of uplink sounding reference signal resources.

In one embodiment, each set of reference signal resources of the plurality of sets of reference signal resources is associated with an apparatus antenna panel.

In certain embodiments, the first uplink transmission beam pattern is different from the second uplink transmission beam pattern.

In some embodiments, the processor reports a power headroom report, the power headroom report comprises one power headroom for the serving cell corresponding to the first uplink transmission and the second uplink transmission, and the power headroom report comprises a first power headroom corresponding to the first uplink transmission and a second power headroom corresponding to the second uplink transmission.

In various embodiments, in response to the one power headroom being calculated with respect to a reference format, the one power headroom corresponds to an apparatus panel having a lowest index value among a plurality of antenna panels the apparatus operates with, or a set of reference signal resources having a lowest index value among a plurality of sets of reference signal resource.

In one embodiment, the power headroom report comprising the first power headroom and the second power headroom is transmitted on only one of the first uplink transmission and the second uplink transmission that corresponds to an apparatus panel having a lowest index among a plurality of antenna panels the apparatus operates with, or a set of reference signal resources having a lowest index among a plurality of sets of reference signal resource.

In certain embodiments, the processor reports a first power headroom report including a first power headroom corresponding to the first uplink transmission, reports a second power headroom report including a second power headroom corresponding to the second uplink transmission, the first power headroom report is transmitted on the first uplink transmission, and the second power headroom report is transmitted on the second uplink transmission.

In some embodiments, the closed-loop power control process is updated based on one of at least the following: only a first transmit power control command of the two transmit power control commands is accumulated and a second transmit power control command of the two transmit power control commands is discarded; a summation of the two transmit power control commands is accumulated and applied to the first uplink transmission and maintained for the second uplink transmission; and two transmit power control command fields are concatenated to form a single extended transmit power control command field with a larger range, a larger resolution, or a combination thereof.

In various embodiments, in response to the scheduling information not containing an indication for an uplink beam pattern, the first uplink transmission follows a first spatial transmission filter for a first uplink control channel resource, the second uplink transmission follows a second spatial transmission filter for a second uplink control channel resource, and the first uplink control channel resource is different from the second uplink control channel resource.

In one embodiment, the apparatus further comprises a transmitter that transmits a report of an apparatus capability supporting a second maximum number of overlapping uplink transmissions with different transmission beam patterns or different spatial domain transmission filters for the serving cell, wherein the configured first maximum number of overlapping of uplink transmissions is less than or equal to the second maximum number of overlapping uplink transmissions.

In certain embodiments, the apparatus is not expected to receive scheduling information for the second uplink transmission that corresponds to the second uplink beam pattern or the second spatial domain transmission filter that is same as the first uplink beam pattern or the first spatial domain transmission filter corresponding to the first uplink transmission.

In some embodiments: the processor operates the apparatus with a plurality of apparatus antenna panels; and the receiver receives an indication indicating at least a first apparatus antenna panel of the plurality of apparatus antenna panels operates in a power saving mode; wherein each uplink transmission of the first plurality of uplink transmissions is associated with an apparatus antenna panel other than the at least first apparatus antenna panel indicated to operate in power saving mode.

In various embodiments, the apparatus is not expected to receive scheduling information for an uplink transmission that corresponds to an uplink beam pattern or a spatial domain transmission filter associated with an apparatus antenna panel among the at least first apparatus antenna panel indicated to operate in power saving or low power mode.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving, by use of a receiver, a message that configures a set of uplink power control parameters for a serving cell;
receiving, by use of the receiver, scheduling information for a first plurality of overlapping uplink transmissions for the serving cell, wherein:
the first plurality of overlapping uplink transmissions comprises a first uplink transmission and a second uplink transmission;
the first uplink transmission corresponds to a first uplink transmission beam pattern of a plurality of uplink transmission beam patterns or a first spatial domain transmission filter of a plurality of spatial domain transmission filters; and
the second uplink transmission corresponds to a second uplink transmission beam pattern of the plurality of uplink transmission beam patterns or a second spatial domain transmission filter of the plurality of spatial domain transmission filters;
determining, by use of a processor, a first transmit power for the first uplink transmission based on a first set of uplink power control parameters of the set of uplink power control parameters;
determining, by use of the processor, a second transmit power for the second uplink transmission based on a second set of uplink power control parameters of the set of uplink power control parameters;
performing, by use of the processor, the first uplink transmission using the first uplink transmission beam pattern or the first spatial domain transmission filter based on the first transmit power; and
performing, by use of the processor, the second uplink transmission using the second uplink transmission beam pattern or the second spatial domain transmission filter based on the second transmit power.

2. The method of claim 1, further comprising receiving, by use of the receiver, a first message that configures reception of scheduling information for overlapping uplink transmissions for a serving cell, wherein the scheduling information for the first plurality of overlapping uplink transmissions for the serving cell is based on the configuration of the first message.

3. The method of claim 1, wherein the scheduling information comprises two transmit power control commands.

4. The method of claim 3, wherein the two transmit power control commands are associated with a same closed-loop power control process.

5. The method of claim 4, wherein the same closed-loop power control process is updated based on:
only a first transmit power control command of the two transmit power control commands is accumulated and a second transmit power control command of the two transmit power control commands is discarded;
a summation of the two transmit power control commands is accumulated and applied to the first uplink transmission and maintained for the second uplink transmission;
two transmit power control command fields are concatenated to form a single extended transmit power control command field with a larger range, a larger resolution, or a combination thereof; or
some combination thereof.

6. The method of claim 1, further comprising transmitting a report of a user equipment capability for receiving scheduling information for a maximum number of overlapping of uplink transmissions for the serving cell.

7. The method of claim 1, further comprising determining a first configured maximum output power corresponding to the first uplink transmission beam pattern or the first spatial domain transmission filter, and determining a second configured maximum output power corresponding to the second uplink transmission beam pattern or the second spatial domain transmission filter, wherein the first configured maximum output power and the second configured maximum output power are based on the scheduling information and, wherein the first transmit power is determined based on the first configured maximum output power and the second transmit power is determined based on the second configured maximum output power.

8. The method of claim 1, wherein each uplink transmission of the first plurality of overlapping uplink transmissions is associated with a user equipment antenna panel.

9. The method of claim 1, wherein the first uplink transmission and the second uplink transmission are in a same bandwidth part of a same uplink carrier of the serving cell.

10. The method of claim 1, wherein the scheduling information comprises one or more physical downlink control channels.

11. The method of claim 10, wherein the scheduling information for the first uplink transmission is on a first physical downlink control channel and the scheduling information for the second uplink transmission is on a second physical downlink control channel, and wherein a user equipment expects to receive the scheduling information for the second uplink transmission that comprises an uplink bandwidth part that is same as an uplink bandwidth part in the scheduling information for the first uplink transmission.

12. The method of claim 1, wherein each uplink transmission beam pattern of the plurality of uplink transmission beam patterns is associated with a reference signal resource of a set of reference signal resources of a plurality of sets of reference signal resources, and each set of reference signal resources of the plurality of sets of reference signal resources comprises a number of downlink reference signal resources or a number of uplink sounding reference signal resources.

13. The method of claim 12, wherein each set of reference signal resources of the plurality of sets of reference signal resources is associated with a user equipment antenna panel.

14. The method of claim 1, wherein the first uplink transmission beam pattern is different from the second uplink transmission beam pattern.

15. The method of claim 1, further comprising reporting a power headroom report, wherein the power headroom report comprises one power headroom for the serving cell corresponding to the first uplink transmission and the second uplink transmission, and the power headroom report comprises a first power headroom corresponding to the first uplink transmission and a second power headroom corresponding to the second uplink transmission.

16. The method of claim 1, further comprising reporting a first power headroom report including a first power headroom corresponding to the first uplink transmission and reporting a second power headroom report including a second power headroom corresponding to the second uplink transmission, wherein the first power headroom report is transmitted on the first uplink transmission and the second power headroom report is transmitted on the second uplink transmission.

17. The method of claim 1, wherein, in response to the scheduling information not containing an indication for an uplink beam pattern, the first uplink transmission follows a first spatial transmission filter for a first uplink control channel resource, the second uplink transmission follows a second spatial transmission filter for a second uplink control channel resource, and the first uplink control channel resource is different from the second uplink control channel resource.

18. The method of claim 1, wherein a user equipment is not expected to receive scheduling information for the second uplink transmission that corresponds to the second uplink transmission beam pattern or the second spatial domain transmission filter that is same as the first uplink transmission beam pattern or the first spatial domain transmission filter corresponding to the first uplink transmission.

19. The method of claim 1, further comprising:
operating a user equipment with a plurality of user equipment antenna panels; and
receiving an indication indicating at least a first user equipment antenna panel of the plurality of user equipment antenna panels operates in a power saving mode;
wherein each uplink transmission of the first plurality of overlapping uplink transmissions is associated with a user equipment antenna panel other than the at least first user equipment antenna panel indicated to operate in power saving mode; and
wherein the user equipment is not expected to receive scheduling information for an uplink transmission that corresponds to an uplink beam pattern or a spatial domain transmission filter associated with a user equipment antenna panel among the at least first user equipment antenna panel indicated to operate in power saving mode.

20. An apparatus comprising:
a receiver that:
  receives a message that configures a set of uplink power control parameters for a serving cell; and
  receives scheduling information for a first plurality of overlapping uplink transmissions for the serving cell, wherein:
    the first plurality of overlapping uplink transmissions comprises a first uplink transmission and a second uplink transmission;
    the first uplink transmission corresponds to a first uplink transmission beam pattern of a plurality of uplink transmission beam patterns or a first spatial domain transmission filter of a plurality of spatial domain transmission filters; and
    the second uplink transmission corresponds to a second uplink transmission beam pattern of the plurality of uplink transmission beam patterns or a second spatial domain transmission filter of the plurality of spatial domain transmission filters; and
a processor that:
  determines a first transmit power for the first uplink transmission based on a first set of uplink power control parameters of the set of uplink power control parameters;
  determines a second transmit power for the second uplink transmission based on a second set of uplink power control parameters of the set of uplink power control parameters;
  performs the first uplink transmission using the first uplink transmission beam pattern or the first spatial domain transmission filter based on the first transmit power; and
  performs the second uplink transmission using the second uplink transmission beam pattern or the second spatial domain transmission filter based on the second transmit power.

* * * * *